(12) United States Patent
Funakura et al.

(10) Patent No.: US 8,162,845 B2
(45) Date of Patent: Apr. 24, 2012

(54) ENVIRONMENT CONTROL DEVICE, ENVIRONMENT CONTROL METHOD, ENVIRONMENT CONTROL PROGRAM, AND ENVIRONMENT CONTROL SYSTEM

(75) Inventors: Masami Funakura, Osaka (JP); Etsuko Kanai, Kyoto (JP); Yasutaka Maeda, Osaka (JP)

(73) Assignee: Panasonic Corporation, Osaka (JP)

( * ) Notice: Subject to any disclaimer, the term of this patent is extended or adjusted under 35 U.S.C. 154(b) by 994 days.

(21) Appl. No.: 12/096,163

(22) PCT Filed: Nov. 17, 2006

(86) PCT No.: PCT/JP2006/322963
§ 371 (c)(1),
(2), (4) Date: Jun. 4, 2008

(87) PCT Pub. No.: WO2007/066493
PCT Pub. Date: Jun. 14, 2007

(65) Prior Publication Data
US 2009/0124926 A1 May 14, 2009

(30) Foreign Application Priority Data
Dec. 5, 2005 (JP) .................. 2005-351094

(51) Int. Cl.
*A61B 5/02* (2006.01)
*A61B 5/04* (2006.01)
*G06G 7/70* (2006.01)
*G06F 19/00* (2011.01)

(52) U.S. Cl. ......... 600/555; 600/549; 700/276; 700/278
(58) Field of Classification Search .................. 600/555, 600/549; 700/276, 278
See application file for complete search history.

(56) References Cited

U.S. PATENT DOCUMENTS

| 5,145,112 A * | 9/1992 | Ueda ............................ 236/49.3 |
| 5,505,057 A * | 4/1996 | Sato et al. ...................... 62/231 |
| 2002/0103512 A1* | 8/2002 | Echauz et al. ..................... 607/9 |

(Continued)

FOREIGN PATENT DOCUMENTS

JP 4-148142 5/1992

(Continued)

OTHER PUBLICATIONS

International Search Report issued Feb. 27, 2007 in the International (PCT) Application No. PCT/JP2006/322963.

*Primary Examiner* — Max Hindenburg
*Assistant Examiner* — Michael C Stout
(74) *Attorney, Agent, or Firm* — Wenderoth, Lind & Ponack, L.L.P.

(57) ABSTRACT

Comfortable sensation of living bodies is estimated, considering individual differences in biological information on the living bodies staying or residing in a common space, and stimulation contents is properly controlled. A stimulation generator generates a stimulation to be applied to users. Biological information acquirers and acquire time-series data of biological information on the users. Parameter extractors and extract a parameter which is changed with a lapse of time by analyzing the time-series data. Thermal sensation estimators and estimate statuses of the users to the stimulation generated by the stimulation generator, based on the parameter extracted by the parameter extractors and. A multi-user thermal sensation processor integrates estimation results on the users estimated by the thermal sensation estimators and into a single estimation result. A stimulation controller controls the stimulation generator based on the integrated estimation result.

8 Claims, 16 Drawing Sheets

U.S. PATENT DOCUMENTS

| | | | |
|---|---|---|---|
| 2004/0137639 A1* | 7/2004 | Miyazaki et al. | 436/181 |
| 2005/0270151 A1* | 12/2005 | Winick | 340/539.1 |
| 2006/0247542 A1* | 11/2006 | Watanabe et al. | 600/500 |
| 2009/0276062 A1* | 11/2009 | Kanai et al. | 700/45 |

FOREIGN PATENT DOCUMENTS

| | | |
|---|---|---|
| JP | 05-052382 | 3/1993 |
| JP | 6-147593 | 5/1994 |
| JP | 07-055226 | 3/1995 |
| JP | 08-128694 | 5/1996 |
| JP | 09-014719 | 1/1997 |
| JP | 2833082 | 10/1998 |
| JP | 10-332187 | 12/1998 |
| JP | 2003-42509 | 2/2003 |
| JP | 2005-59821 | 3/2005 |
| JP | 2005-261555 | 9/2005 |

* cited by examiner

FIG. 4

| MAXIMUM LYAPUNOV INDEX | PULSE WAVE HEIGHT MAXIMUM VALUE | |
|---|---|---|
| | INCREASE | DECREASE |
| INCREASE | 0 → HOT | 0 → COLD |
| DECREASE | COLD → 0 | HOT → 0 |

FIG. 7

| | | ESTIMATION DATA FROM THERMAL SENSATION ESTIMATOR 103a | | | |
|---|---|---|---|---|---|
| | | COLD → 0 | 0 → HOT | HOT → 0 | 0 → COLD |
| ESTIMATION DATA FROM THERMAL SENSATION ESTIMATOR 103b | COLD → 0 | COLD → 0 | 0 → HOT | HOT → 0 | 0 → COLD |
| | 0 → HOT | COLD → 0 | 0 → HOT | COLD/HOT → 0 | 0 → COLD |
| | HOT → 0 | 0 → HOT | 0 → HOT | 0 → HOT | 0→COLD/HOT |
| | 0 → COLD | COLD/HOT → 0 | 0 → COLD/HOT | HOT → 0 | 0 → COLD |
| | | 0 → COLD | 0 → COLD | 0 → COLD | 0 → COLD |

FIG. 12

| ESTIMATION DATA FROM THERMAL SENSATION ESTIMATOR 103b | ESTIMATION DATA FROM THERMAL SENSATION ESTIMATOR 103a | | | |
|---|---|---|---|---|
| | COLD → 0 | 0 → HOT | HOT → 0 | 0 → COLD |
| COLD → 0 | COLD → 0 | ☆ | COLD/HOT → 0 | ☆ |
| 0 → HOT | ☆ | ☆ | ☆ | ☆ |
| HOT → 0 | COLD/HOT → 0 | ☆ | HOT → 0 | ☆ |
| 0 → COLD | ☆ | ☆ | ☆ | ☆ |

☆ : PRIORITIZE USER WITH LONGER STATUS CONTINUATION TIME

ENVIRONMENT CONTROL DEVICE, ENVIRONMENT CONTROL METHOD, ENVIRONMENT CONTROL PROGRAM, AND ENVIRONMENT CONTROL SYSTEM

TECHNICAL FIELD

The present invention relates to an environment control device, an environment control method, an environment control program, and an environment control system for estimating the status of a living body based on biological information to control a residential environment.

BACKGROUND ART

Heretofore, in controlling a residential environment of the user, an environment control system has been controlled by detecting environmental physical quantities such as a temperature (hereinafter, called as "room temperature") of the residential environment, a humidity (hereinafter, called as "humidity") of the residential environment, a temperature (hereinafter, called as "external temperature") outside the residential environment, and the amount of insolation. Other than the aforementioned control based on the environmental physical quantities, there is proposed an approach of acquiring and analyzing biological information on the user, estimating the status of the user such as a stressful condition, a relaxed condition, an excited condition or the like, and controlling an environment control system based on the estimation result.

For instance, patent document 1 proposes a technique of estimating a psychological status of the user, primarily hot/cold sensations (thermal sensations) by the user's pulse wave amplitude. FIG. 16 is a diagram corresponding to FIG. 5 recited in patent document 1. In patent document 1, correlations between absolute value of pulse wave amplitude (Vp-p in FIG. 16), and thermal sensations (cold/cool/moderately cool/not cold or hot/moderately warm/warm/hot) are expressed by a characteristic curve L. If the absolute value of the user's pulse wave amplitude acquired at a certain point of time is Vpa, the user's thermal sensation is estimated to be "warm". If the absolute value is Vpb, the user's thermal sensation is estimated to be "cool". An air-conditioning system is controlled based on the estimation result.

Also, for instance, patent document 2 proposes additionally mounting a temperature sensor and a humidity sensor in a bed. The thermal sensation of the user in bed is estimated by measuring a temperature of a back portion of the user who is about to sleep. The temperature and the humidity of the bedroom are controlled based on an average value of thermal sensations of plural users.

In patent document 1, the absolute value of the user's pulse wave amplitude, and the user's thermal sensation are correlated, and the user's pulse wave amplitude is acquired to estimate the user's thermal sensation based on the acquired absolute value of the user's pulse wave amplitude. Since the pulse wave amplitude differs among individuals, it is not always the case that every user whose absolute value of the pulse wave amplitude is substantially identical has the same thermal sensation. For instance, even if the user A and the user B have an identical absolute value Vpc of the pulse wave amplitude, the user A may have a thermal sensation corresponding to "moderately cool", and the user B may have a thermal sensation corresponding to "moderately warm". In other words, since patent document 1 does not consider individual differences in the absolute value of the pulse wave amplitude, the air-conditioning system may overcool the room despite that the user A feels "moderately cool", thereby making the user A feel uncomfortable. Also, the technology of patent document 1 is made based on the premise that a single user resides in the residential environment, and patent document 1 does not recite a measure to be taken in a case that plural users stay or reside in a common space.

In patent document 2, the temperature of the user's back portion, and the user's thermal sensation are correlated. The temperature of the user's back portion is detected by the temperature sensor mounted in the bed, and the user's thermal sensation (−3: cold, −2: cool −1: moderately cool, 0: not cold or hot, 1: moderately warm, 2: warm, 3: hot) is estimated based on the detected temperature. The correlation between the temperature of the user's back portion and the user's thermal sensation may differ among individuals. For instance, even if the detected temperatures of the back portions of the user A and the user B are substantially identical to each other, the thermal sensation of the user A may correspond to "moderately cool (−1)", and the thermal sensation of the user B may correspond to "not cold or hot (0)". In other words, since patent document 2 does not consider individual differences in the correlation between the temperature of the user's back portion and the user's thermal sensation, the air-conditioning system may suspend the cooling operation despite that the user B does not feel hot or cold, thereby making the user B feel uncomfortable. Also, in patent document 2, in the case where plural users stay in a common space, an air-conditioning system is controlled based on the premise that the users stay or reside in the common space (bedroom), using an average thermal sensation obtained by averaging the thermal sensations of the users estimated based on the temperatures of the back portions of the users. However, since the thermal sensations of the users are estimated, without considering individual differences in the correlation between the temperature of the user's back portion and the user's thermal sensation, even with use of the average thermal sensation, the air-conditioning system may fail to perform proper air-conditioning control, considering thermal sensations of the users.

Patent document 1: Japanese Patent No. 2,833,082 (pp. 5-6, FIG. 5)

Patent document 2: Japanese Unexamined Patent Publication No. Hei 6-147593 (pp. 2-3, FIG. 2)

SUMMARY OF THE INVENTION

In view of the conventional examples, an object of the present invention is to provide an environment control device, an environment control method, an environment control program, and an environment control system that enable to estimate amenity of living bodies, considering individual differences in biological information, in the case where the living bodies stay or reside in a common space, and properly control stimulation contents based on the estimated amenity.

An environment control device according to an aspect of the invention comprises: a biological information acquiring section for acquiring time-series data of biological information on a plurality of living bodies applied with a stimulation; a parameter extracting section for analyzing the time-series data acquired by the biological information acquiring section to extract a parameter which is changed with a lapse of time; a living body status estimating section for estimating a status of each of the living bodies to the stimulation, based on the parameter extracted by the parameter extracting section; an integration processing section for integrating estimation results on the living bodies estimated by the living body status estimating section into a single estimation result; and a stimulation controlling section for controlling contents of the stimulation to be applied to the living bodies, based on the estimation result integrated by the integration processing section, wherein the living body status estimating section is operative to estimate whether the status of the living body to the stimulation is a status indicating a shift from an uncomfortable state to a comfortable state, or a status indicating a shift from the comfortable state to the uncomfortable state, based on the parameter extracted by the parameter extracting section, with respect to the each of the living bodies.

An environment control method according to another aspect of the invention comprises: a biological information acquiring step of acquiring time-series data of biological information on a plurality of living bodies applied with a stimulation; a parameter extracting step of analyzing the time-series data acquired in the biological information acquiring step to extract a parameter which is changed with a lapse of time; a living body status estimating step of estimating a status of each of the living bodies to the stimulation, based on the parameter extracted in the parameter extracting step; an integration processing step of integrating estimation results on the living bodies estimated in the living body status estimating step into a single estimation result; and a stimulation controlling step of controlling contents of the stimulation to be applied to the living bodies, based on the estimation result integrated in the integration processing step, wherein the living body status estimating step is a step of estimating whether the status of the living body to the stimulation is a status indicating a shift from an uncomfortable state to a comfortable state, or a status indicating a shift from the comfortable state to the uncomfortable state, based on the parameter extracted in the parameter extracting step, with respect to the each of the living bodies.

An environment control program according to yet another aspect of the invention causes a computer to function as: biological information acquiring means for acquiring time-series data of biological information on a plurality of living bodies applied with a stimulation; parameter extracting means for analyzing the time-series data acquired by the biological information acquiring means to extract a parameter which is changed with a lapse of time; living body status estimating means for estimating a status of each of the living bodies to the stimulation, based on the parameter extracted by the parameter extracting means; integration processing means for integrating estimation results on the living bodies estimated by the living body status estimating means into a single estimation result; and stimulation controlling means for controlling contents of the stimulation to be applied to the living bodies, based on the estimation result integrated by the integration processing means, wherein the living body status estimating means is operative to estimate whether the status of the living body to the stimulation is a status indicating a shift from an uncomfortable state to a comfortable state, or a status indicating a shift from the comfortable state to the uncomfortable state, based on the parameter extracted by the parameter extracting means, with respect to the each of the living bodies.

An environment control system according to still another aspect of the invention comprises: a stimulation generating section for generating a stimulation to be applied to a plurality of living bodies; a measuring section for measuring biological information on each of the living bodies; a biological information acquiring section for acquiring time-series data of biological information on the living bodies measured by the measuring section; a parameter extracting section for analyzing the time-series data acquired by the biological information acquiring section to extract a parameter which is changed with a lapse of time; a living body status estimating section for estimating a status of the each of the living bodies to the stimulation generated by the stimulation generating section, based on the parameter extracted by the parameter extracting section; an integration processing section for integrating estimation results on the living bodies estimated by the living body status estimating section into a single estimation result; and a stimulation controlling section for controlling the stimulation generating section, based on the estimation result integrated by the integration processing section, wherein the living body status estimating section is operative to estimate whether the status of the living body to the stimulation generated by the stimulation generating section is a status indicating a shift from an uncomfortable state to a comfortable state, or a status indicating a shift from the comfortable state to the uncomfortable state, based on the parameter extracted by the parameter extracting section, with respect to the each of the living bodies.

In the above arrangements, the stimulation to be applied to the living bodies is generated, and the time-series data of biological information on the living bodies applied with the stimulation are acquired. Subsequently, the acquired time-series data are analyzed, the parameter which is changed with a lapse of time is extracted, and the statuses of the living bodies to the stimulation are estimated based on the extracted parameter. Then, the estimation results on the living bodies are integrated into the single estimation result. The contents of the stimulation to be applied to the living bodies is controlled based on the integrated estimation result. Also, estimation is made as to whether the status of the living body to the stimulation is the status indicating the shift from the uncomfortable state to the comfortable state, or the status indicating the shift from the comfortable state to the uncomfortable state, based on the extracted parameter, with respect to the each of the living bodies.

In the above arrangements, in the case where plural living bodies stay or reside in a common space, the statuses of the living bodies are estimated based on the parameter which is changed with a lapse of time. This enables to estimate the statuses of the living bodies, considering individual differences on biological information, without using an absolute value of a biological information parameter which may differ among the living bodies, and properly control the stimulation contents based on the estimated statuses of the living bodies.

BRIEF DESCRIPTION OF THE DRAWINGS

FIG. 4 is a diagram showing a table, wherein a relation between pulse wave height maximum value and thermal sensation, and a relation between maximum Lyapunov index and thermal sensation are expressed in the format of matrix.

FIG. 7 is a diagram showing a table for describing the integration operation on thermal sensation estimation data shown in FIG. 6.

FIG. 12 is a diagram showing a table for describing the integration operation on thermal sensation estimation data shown in FIG. 11.

DETAILED DESCRIPTION OF THE INVENTION

Figure 1:
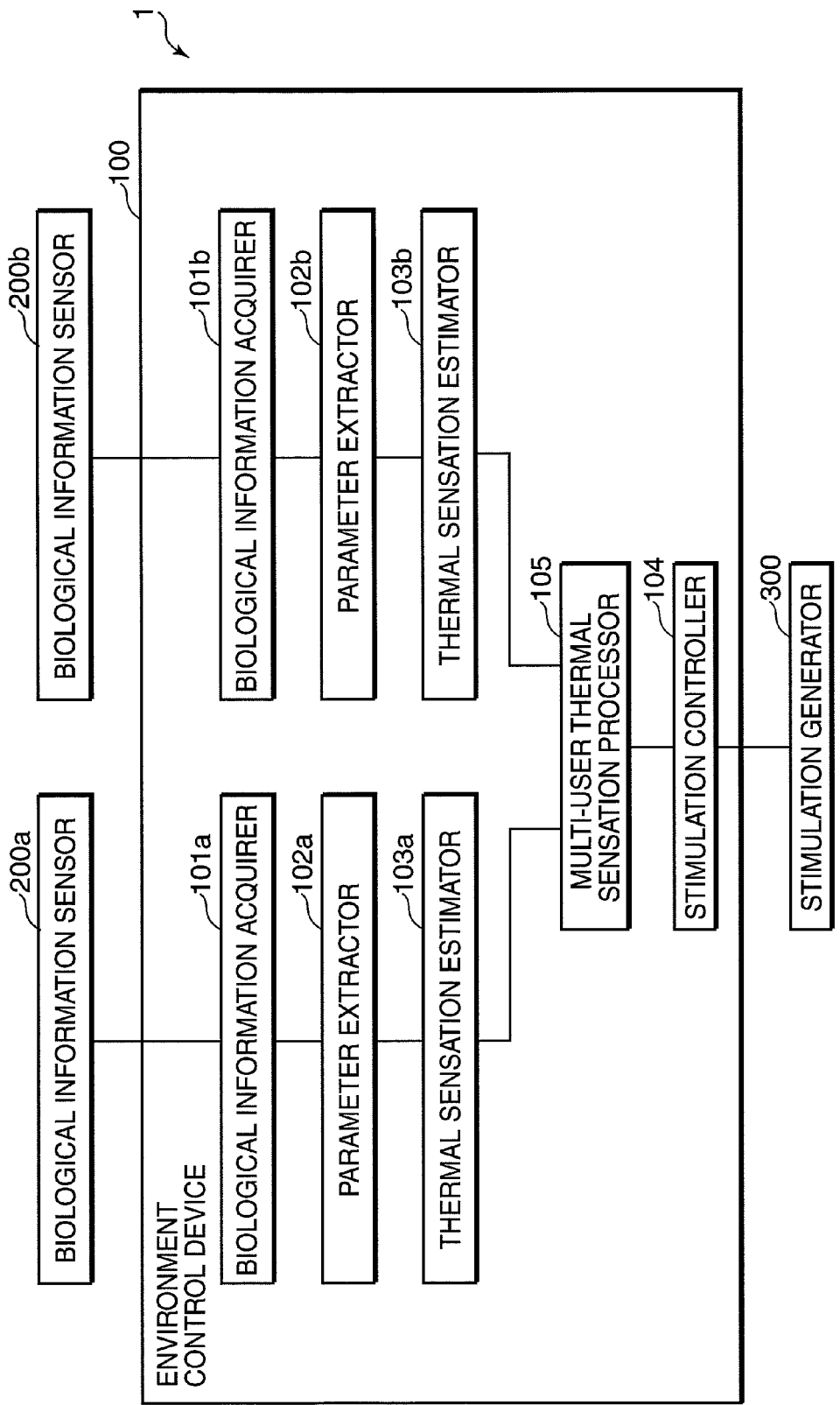
FIG. 1 is a block diagram showing a configuration of an environment control system in a first embodiment of the invention.

In the following, embodiments of the invention are described referring to the drawings.

First Embodiment

FIG. 1 is a block diagram showing a configuration of an environment control system in the first embodiment of the invention. Referring to FIG. 1, an environment control system 1 includes an environment control device 100, biological information sensors 200a and 200b, and a stimulation generator 300.

The biological information sensor 200a, 200b is adapted to measure biological information on each of living bodies. Specifically, the biological information sensor 200a, 200b is a pulse wave sensor, and is configured in such a manner that near infrared light is emitted from a light emitter toward a skin surface of a user's finger or earlobe, transmitted light through the skin or reflected light on the skin is detected by a light detector, and a change in the detected light is converted into an electric signal to detect a change in the blood flow rate, whereby the pulse wave of the user is measured. The stimulation generator 300 generates thermal stimulations to be applied to users. The stimulation generator 300 includes e.g. a household air-conditioning system. The thermal stimulations are hot stimulations, cold stimulations, or hot and cold stimulations.

The environment control device 100 controls the environment in a space where plural users stay or reside. The environment control device 100 includes biological information acquirers 101a and 101b, parameter extractors 102a and 102b, thermal sensation estimators 103a and 103b, a stimulation controller 104, and a multi-user thermal sensation processor 105. The environment control device 100 includes e.g. a CPU, an ROM, and an RAM, and functions as the biological information acquirers 101a and 101b, the parameter extractors 102a and 102b, the thermal sensation estimators 103a and 103b, the stimulation controller 104, and the multi-user thermal sensation processor 105 by causing the CPU to execute an environment control program stored in the ROM. The environment control program is recorded in a computer-readable recording medium such as a CD-ROM. Alternatively, the environment control device 100 may install the environment control program from the recording medium. Further alternatively, in the case where the environment control device 100 is communicable with other device via a network, the environment control device 100 may download the environment control program from the other device such as a server.

The biological information acquirer 101a, 101b acquires time-series data of biological information (pulse wave) on each of the users, which has been measured by the biological information sensor 200a, 200b.

The parameter extractor 102a, 102b analyzes the time-series data of pulse wave, and calculates a pulse wave parameter. The thermal sensation estimator 103a, 103b estimates a thermal sensation of the user, based on the pulse wave parameter extracted by the parameter extractor 102a, 102b. In this embodiment, the biological information sensor 200a, the biological information acquirer 101a, the parameter extractor 102a, and the thermal sensation estimator 103a are operated with respect to a user A. The biological information sensor 200b, the biological information acquirer 101b, the parameter extractor 102b, and the thermal sensation estimator 103b are operated with respect to a user B who stays or resides in a common space with the user A.

The stimulation controller 104 controls the stimulation generator 300. The multi-user thermal sensation processor 105 receives estimation results on the users estimated by the thermal sensation estimators 103a and 103b, and outputs an integrated estimation result obtained by integrating thermal sensations of the users. The stimulation controller 104 determines contents of stimulation to be applied to the users and an environmental condition to be generated, based on the integrated estimation result on thermal sensations of the users which has been outputted from the multi-user thermal sensation processor 105, to output the determination result to the stimulation generator 300.

In this embodiment, the biological information sensors 200a and 200b correspond to an example of a biological information measuring section. The stimulation generator 300 corresponds to an example of a stimulation generating section. The biological information acquirers 101a and 101b correspond to an example of a biological information acquiring section. The parameter extractors 102a and 102b correspond to an example of a parameter extracting section. The thermal sensation estimators 103a and 103b correspond to an example of a living body status estimating section. The multi-user thermal sensation processor 105 corresponds to an example of an integration processing section. The stimulation controller 104 corresponds to an example of a stimulation controlling section.

Figure 2:
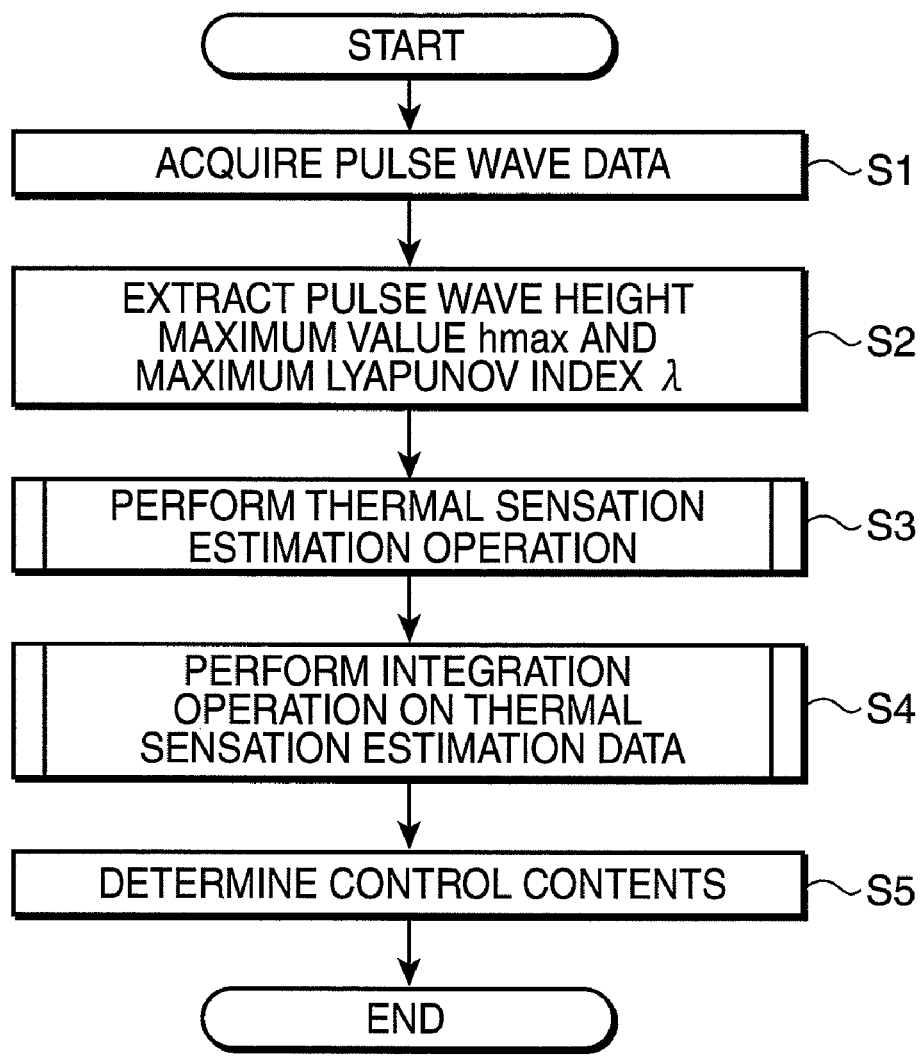
FIG. 2 is a flowchart showing a flow of an environment control operation to be performed by the environment control system shown in FIG. 1.

In the following, an environment control operation to be performed by the environment control system shown in FIG. 1 is described. FIG. 2 is a flowchart showing a flow of an environment control operation to be performed by the environment control system shown in FIG. 1. First, the biological information sensor 200a measures a pulse wave of the user A, and the biological information acquirer 101a acquires time-series pulse wave data on the user A (Step S1). Then, the parameter extractor 102a extracts and stores a pulse wave height maximum value hmax, as a peak value of waveform corresponding to each pulse of pulse wave data, out of the time-series pulse wave data acquired by the biological information acquirer 101a, at every predetermined time interval, and calculates and stores a maximum Lyapunov index λ by chaos analyzing the time-series pulse wave data at every predetermined time interval (Step S2).

Then, the thermal sensation estimator 103a calculates a differential value Δhmax of the pulse wave height maximum value hmax, based on a current value of the pulse wave height maximum value hmax extracted by the parameter extractor 102a, a previous value thereof extracted by the parameter extractor 102a immediately before the current value extraction, and a sampling frequency; and calculates a differential value Δλ of the maximum Lyapunov index λ, based on a current value of the maximum Lyapunov index λ calculated by the parameter extractor 102a, a previous value thereof calculated by the parameter extractor 102a immediately before the current value calculation, and a sampling frequency. Then, the thermal sensation estimator 103a estimates a thermal sensation of the user A, based on the calculated differential value Δhmax of the pulse wave height maximum value, and the calculated differential value Δλ of the maximum Lyapunov index; and outputs the estimation result on the thermal sensation of the user A to the multi-user thermal sensation processor 105 (Step S3). The operations from Step S1 to Step S3 shown in FIG. 2 are performed with respect to the user B in the similar manner as mentioned above, and the thermal sensation estimator 103b estimates a thermal sensation of the user B and outputs the estimated result to the multi-user thermal sensation processor 105.

In the following, a thermal sensation estimation operation to be performed with respect to the user in Step S3 shown in FIG. 2 is described. Since there are individual differences in the absolute value of pulse wave amplitude, use of the absolute value of pulse wave amplitude in estimating thermal sensations of the users may degrade estimation precision. The inventors found that there are strong correlations between a change in the maximum Lyapunov index, which is expressed by chaos analyzing fluctuation of pulse wave amplitude, and a change in the thermal sensation of the user, in addition to correlations between a change in the pulse wave height maximum value corresponding to a change in the pulse wave amplitude, and a change in the thermal sensation of the user. The inventors also found that it is possible to estimate thermal sensations of the users to a thermal stimulation (a change in the thermal environment) with high precision, with no or less influence of individual differences, by estimating thermal sensations of the users based on a change in the pulse wave height maximum value and a change in the maximum Lyapunov index. The pulse wave height maximum value indicates a peak value of pulse waveform corresponding to several pulses in pulse wave data, which have been acquired within a certain time. Alternatively, the pulse wave height maximum value may be a peak value of waveform corresponding to each pulse in pulse wave data, or an average value of peak values of pulse waveforms each corresponding to several pulses, or pulse wave amplitude.

Figure 3:
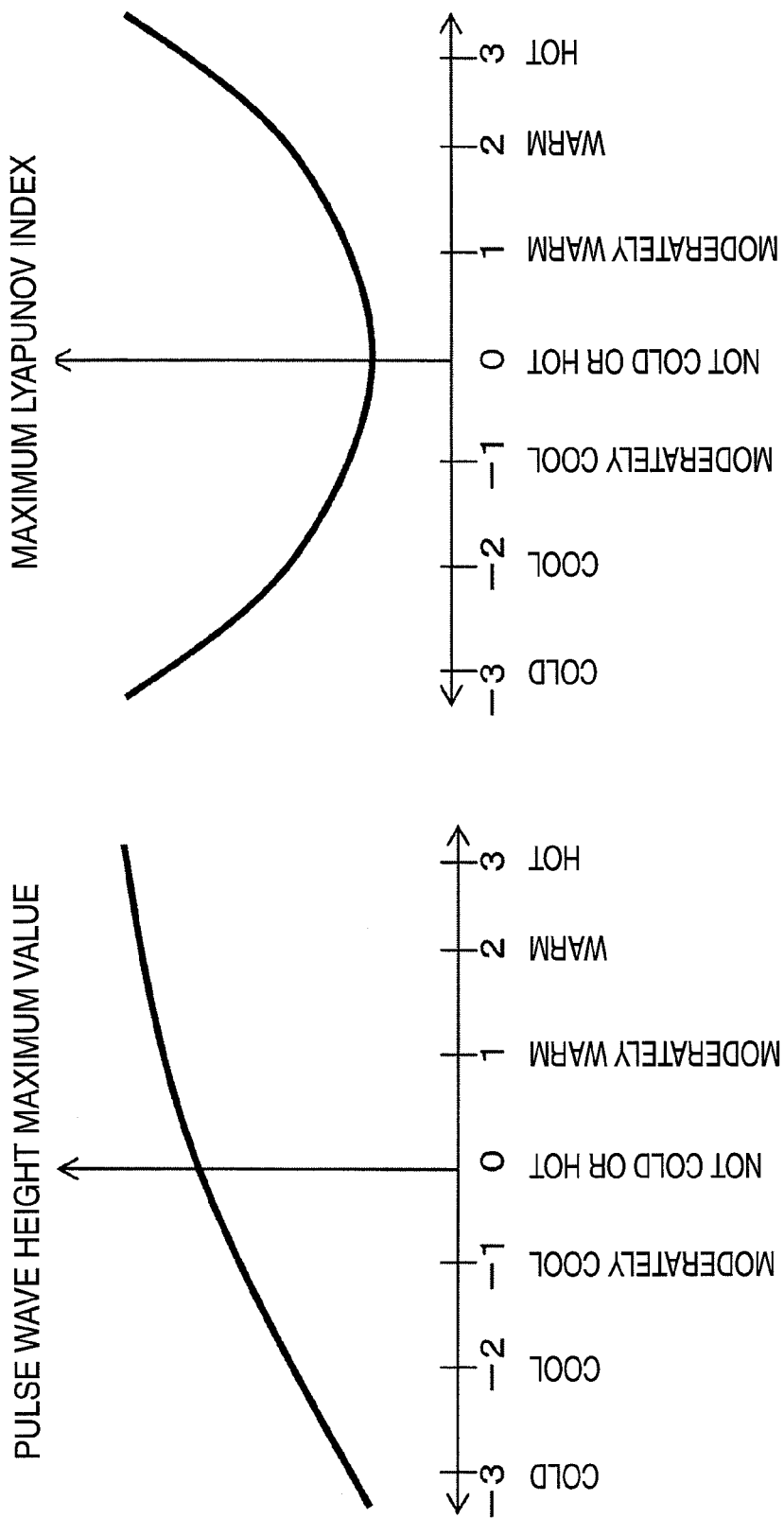
FIG. 3 is a graph showing correlations between maximum Lyapunov index of pulse wave, pulse wave height maximum value, and user's thermal sensation.

FIG. 3 is a graph showing correlations between the maximum Lyapunov index of pulse wave, the pulse wave height maximum value, and the user's thermal sensation, which is obtained based on an experiment conducted by the inventors using subjects. As shown in FIG. 3, the maximum Lyapunov index and the user's thermal sensation have correlations, as expressed by a U-shaped graph, wherein the maximum Lyapunov index has an extremal value in the vicinity of thermal sensation "0" (corresponding to a condition where the user does not feel cold or hot). The pulse wave height maximum value and the user's thermal sensation have correlations that the pulse wave height maximum value monotonously increases, as the thermal sensation is shifted from a cold condition (−3) to a hot condition (+3).

FIG. 4 is a diagram showing a table based on the finding shown in FIG. 3, wherein a relation between the maximum pulse wave height and the thermal sensation, and a relation between the maximum Lyapunov index and the thermal sensation are expressed in the format of matrix. The thermal sensation estimator 103a, 103b pre-stores table data corresponding to the table. As shown in FIG. 4, in the case where the pulse wave height maximum value is increased, and the maximum Lyapunov index is decreased, the user's thermal sensation is shifted from a cold condition (−3) to a neutral condition (0). In the case where the pulse wave height maximum value is decreased, and the maximum Lyapunov index is decreased, the user's thermal sensation is shifted from a hot condition (+3) to a neutral condition (0). In the case where the pulse wave height maximum value is increased, and the maximum Lyapunov index is increased, the user's thermal sensation is shifted from a neutral condition (0) to a hot condition (+3). In the case where the pulse wave height maximum value is decreased, and the maximum Lyapunov index is increased, the user's thermal sensation is shifted from a neutral condition (0) to a cold condition (−3).

The thermal sensation estimator 103a, 103b estimates the following, using the table shown in FIG. 4, after a control by a system constituting a thermal environment is executed. Specifically, in the case where the pulse wave height maximum value is increased and the maximum Lyapunov index is decreased, the thermal sensation estimator 103a, 103b estimates that the user's thermal sensation has shifted from a cold condition to a neutral condition (0). In the case where the pulse wave height maximum value is increased and the maximum Lyapunov index is increased, the thermal sensation estimator 103a, 103b estimates that the users thermal sensation has shifted from a neutral condition (0) to a hot condition. In the case where the pulse wave height maximum value is decreased and the maximum Lyapunov index is decreased, the thermal sensation estimator 103a, 103b estimates that the user's thermal sensation has shifted from a hot condition to a neutral condition (0). In the case where the pulse wave height maximum value is decreased and the maximum Lyapunov index is increased, the thermal sensation estimator 103a, 103b estimates that the user's thermal sensation has shifted from a neutral condition (0) to a cold condition.

Figure 5:
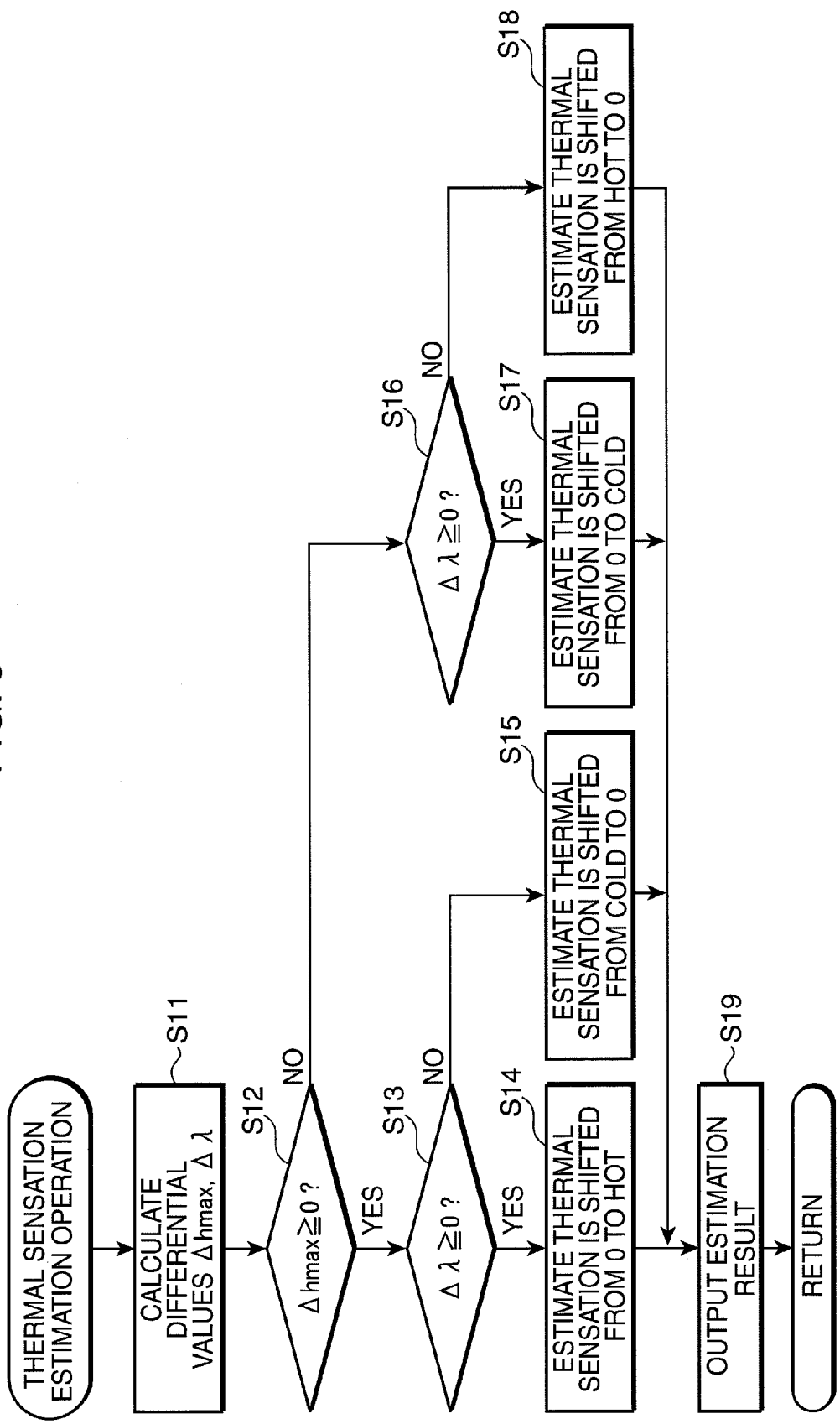
FIG. 5 is a flowchart showing a flow of a thermal sensation estimation operation to be performed by a thermal sensation estimator in the first embodiment of the invention.

FIG. 5 is a flowchart showing a flow of the thermal sensation estimation operation to be performed by the thermal sensation estimator 103a, 103b in the first embodiment.

First, the thermal sensation estimator 103a, 103b calculates a differential value Δhmax of the pulse wave height maximum value hmax, based on a current value of the pulse wave height maximum value hmax extracted by the parameter extractor 102a, 102b, a previous value thereof extracted by the parameter extractor 102a, 102b immediately before the current value extraction, and a sampling frequency. The thermal sensation estimator 103a, 103b also calculates a differential value Δλ of the maximum Lyapunov index λ, based on a current value of the maximum Lyapunov index λ calculated by the parameter extractor 102a, 102b concurrently with the current value of the pulse wave height maximum value hmax, a previous value thereof calculated immediately before the current value calculation by the parameter extractor 102a, 102b and concurrently with the previous value of the pulse wave height maximum value hmax, and a sampling frequency (Step S11).

Then, the thermal sensation estimator 103a, 103b makes a judgment on the differential value Δhmax of the pulse wave height maximum value hmax (Step S12). Subsequently, the thermal sensation estimator 103a, 103b makes a judgment on the differential value Δλ of the maximum Lyapunov index λ (Step S13 and Step S16). Specifically, if the differential value Δhmax of the pulse wave height maximum value hmax is 0 or more, in other words, the pulse wave height maximum value is increased (YES in Step S12), and if the differential value Δλ of the maximum Lyapunov index λ is 0 or more, in other words, the maximum Lyapunov index is increased (YES in Step S13), the thermal sensation estimator 103a, 103b estimates that the user's thermal sensation is shifted from a neutral condition (0) where the user does not feel cold or hot to a hot condition, referring to the pre-stored table data shown in FIG. 4 (Step S14). Then, the thermal sensation estimator 103a, 103b outputs estimation data indicating the estimation result on the user's thermal sensation to the multi-user thermal sensation processor 105 (Step S19).

If the differential value Δhmax of the pulse wave height maximum value hmax is 0 or more, in other words, the pulse wave height maximum value is increased (YES in Step S12), and if the differential value Δλ of the maximum Lyapunov index λ is less than 0, in other words, the maximum Lyapunov index is decreased (NO in Step S13), the thermal sensation estimator 103a, 103b estimates that the user's thermal sensation is shifted from a cold condition to a neutral condition (0), based on the pre-stored table data shown in FIG. 4 (Step S15). Then, the thermal sensation estimator 103a, 103b outputs estimation data indicating the estimation result on the user's thermal sensation to the multi-user thermal sensation processor 105 (Step S19).

If the differential value Δhmax of the pulse wave height maximum value hmax is less than 0, in other words, the pulse wave height maximum value is decreased (NO in Step S12), and if the differential value Δλ of the maximum Lyapunov index λ is 0 or more, in other words, the maximum Lyapunov index is increased (YES in Step S16), the thermal sensation estimator 103a, 103b estimates that the user's thermal sensation is shifted from a neutral condition (0) to a cold condition, based on the pre-stored table data shown in FIG. 4 (Step S17). Then, the thermal sensation estimator 103a, 103b outputs estimation data indicating the estimation result on the user's thermal sensation to the multi-user thermal sensation processor 105 (Step S19).

If the differential value Δhmax of the pulse wave height maximum value hmax is less than 0, in other words, the pulse wave height maximum value is decreased (NO in Step S12), and if the differential value Δλ of the maximum Lyapunov index λ is less than 0, in other words, the maximum Lyapunov index is decreased (NO in Step S16), the thermal sensation estimator 103a, 103b estimates that the user's thermal sensation is shifted from a hot condition to a neutral condition (0) (Step S18). Then, the thermal sensation estimator 103a, 103b outputs estimation data indicating the estimation result on the user's thermal sensation to the multi-user thermal sensation processor 105 (Step S19).

Referring back to FIG. 2, the multi-user thermal sensation processor 105 receives the estimation data on the user A estimated by the thermal sensation estimator 103a, and the estimation data on the user B estimated by the thermal sensation estimator 103b to integrate the two estimation data into one estimation data (Step S4).

Figure 6:
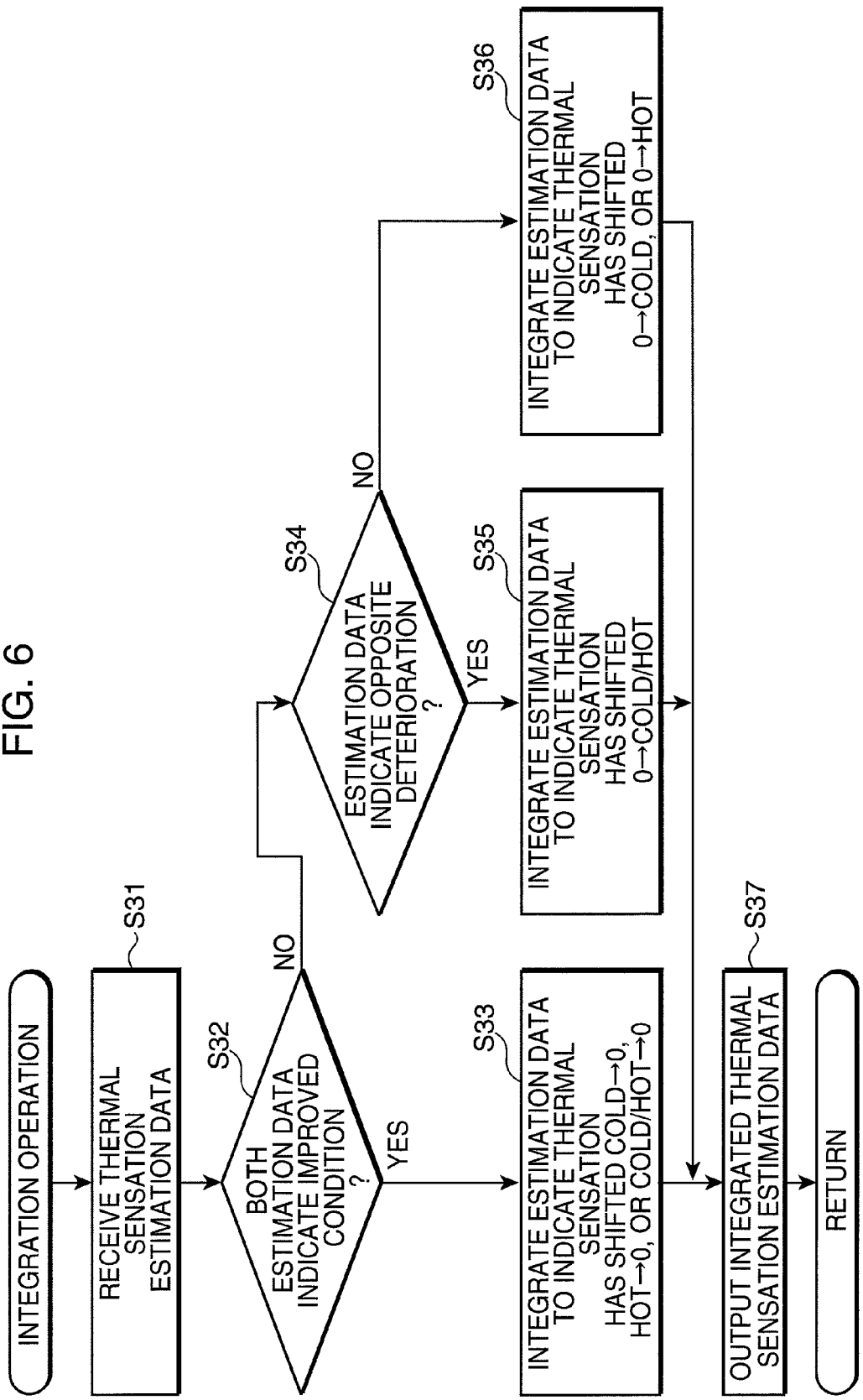
FIG. 6 is a flowchart showing a flow of an integration operation to be performed by a multi-user thermal sensation processor in the first embodiment of the invention.

In the following, an integration operation to be performed by the multi-user thermal sensation processor 105 is described. FIG. 6 is a flowchart showing a flow of the integration operation to be performed by the multi-user thermal sensation processor 105 in the first embodiment. First, the multi-user thermal sensation processor 105 receives the thermal sensation estimation data on the user A from the thermal sensation estimator 103a, and receives the thermal sensation estimation data on the user B from the thermal sensation estimator 103b (Step S31).

Then, the multi-user thermal sensation processor 105 integrates the received two thermal sensation estimation data in such a manner that the user whose thermal sensation is shifted to a deteriorated condition is prioritized. FIG. 7 is a diagram showing a table for describing the integration operation on thermal sensation estimation data shown in FIG. 6. The multi-user thermal sensation processor 105 integrates the thermal sensation estimation data in such a manner that the user whose thermal sensation is shifted to a deteriorated condition (in other words, the thermal sensation is shifted from a neutral condition (0) to a cold condition, or from a neutral condition (0) to a hot condition) is prioritized in accordance with combination of the thermal sensation estimation data on the user A and the user B, which have been estimated by the thermal sensation estimators 103a and 103b, respectively. In other words, the multi-user thermal sensation processor 105 judges whether both of the thermal sensation estimation data on the user A and the user B indicate an improved condition (in other words, the thermal sensation is shifted from a cold condition to a neutral condition (0), or from a hot condition to a neutral condition (0)) (Step S32).

In the case where it is judged that both of the thermal sensation estimation data on the user A and the user B respectively estimated by the thermal sensation estimators 103a and 103b indicate an improved condition (in other words, the thermal sensation is shifted from a cold condition to a neutral condition (0), or from a hot condition to a neutral condition (0)) (YES in Step S32), the multi-user thermal sensation processor 105 integrates these two thermal sensation estimation data in such a manner that the integrated thermal sensation estimation data indicates that the thermal sensation has shifted from a cold condition to a neutral condition (0), or from a hot condition to a neutral condition (0), or from a cold or hot condition to a neutral condition (0) (Step S33). For instance, as shown in FIG. 7, in the case where the estimation data outputted from the thermal sensation estimator 103a indicates that the thermal sensation has shifted from a cold condition to a neutral condition (0), and the estimation data outputted from the thermal sensation estimator 103b indicates that the thermal sensation has shifted from a cold condition to a neutral condition (0), the multi-user thermal sensation processor 105 determines that the integrated estimation data indicates that the thermal sensation has shifted from a cold condition to a neutral condition (0). In the case where the estimation data outputted from the thermal sensation estimator 103a indicates that the thermal sensation has shifted from a cold condition to a neutral condition (0), and the estimation data outputted from the thermal sensation estimator 103b indicates that the thermal sensation has shifted from a hot condition to a neutral condition (0), the multi-user thermal sensation processor 105 determines that the integrated estimation data indicates that the thermal sensation has shifted from a cold or hot condition to a neutral condition (0). Then, the multi-user thermal sensation processor 105 outputs the integrated thermal sensation estimation data to the stimulation controller 104 (Step S37).

In the case where it is judged that both of the thermal sensation estimation data on the user A and the user B do not indicate an improved condition (NO in Step S32), the multi-user thermal sensation processor 105 judges whether the thermal sensation estimation data on the user A and the user B indicate deteriorated conditions opposite to each other (in other words, the thermal sensation of one of the users A and B has shifted from a neutral condition (0) to a cold condition, and the thermal sensation of the other has shifted from a neutral condition (0) to a hot condition) (Step S34). In the case where it is judged that the thermal sensation estimation data on the user A and the user B indicate deteriorated conditions opposite to each other (in other words, the thermal sensation of one of the users A and B has shifted from a neutral condition (0) to a cold condition, and the thermal sensation of the other has shifted from a neutral condition (0) to a hot condition) (YES in Step S34), the multi-user thermal sensation processor 105 integrates these two thermal sensation estimation data in such a manner that the single integrated thermal sensation estimation data indicates that the thermal sensation has shifted from a neutral condition (0) to a cold or hot condition (Step S35). For instance, as shown in FIG. 7, in the case where the estimation data outputted from the thermal sensation estimator 103a indicates that the thermal sensation has shifted from a neutral condition (0) to a cold condition, and the estimation data outputted from the thermal sensation estimator 103b indicates that the thermal sensation has shifted from a neutral condition (0) to a hot condition, the multi-user thermal sensation processor 105 determines that the integrated estimation data indicates that the thermal sensation has shifted from a neutral condition (0) to a cold or hot condition. In the case where the estimation data outputted from the thermal sensation estimator 103a indicates that the thermal sensation has shifted from a neutral condition (0) to a hot condition, and the estimation data outputted from the thermal sensation estimator 103b indicates that the thermal sensation has shifted from a neutral condition (0) to a cold condition, the multi-user thermal sensation processor 105 determines that the integrated estimation data indicates that the thermal sensation has shifted from a neutral condition (0) to a cold or hot condition. Then, the multi-user thermal sensation processor 105 outputs the integrated thermal sensation estimation data to the stimulation controller 104 (Step S37).

In the case where it is judged that the thermal sensation estimation data on the user A and the user B do not indicate deteriorated conditions opposite to each other, in other words, in the case where the thermal sensation estimation data on one of the users A and B indicates an improved condition (i.e. the thermal sensation has shifted from a cold condition to a neutral condition (0), or from a hot condition to a neutral condition (0)), and the thermal sensation estimation data on the other indicates a deteriorated condition (i.e. the thermal sensation has shifted from a neutral condition (0) to a cold condition, or from a neutral condition (0) to a hot condition) (NO in Step S34), the multi-user thermal sensation processor 105 integrates these two thermal sensation estimation data in such a manner that the integrated thermal sensation estimation data indicates that the thermal sensation has shifted from a neutral condition (0) to a cold condition, or from a neutral condition (0) to a hot condition (Step S36). For instance, as shown in FIG. 7, in the case where the estimation data outputted from the thermal sensation estimator 103a indicates that the thermal sensation has shifted from a cold condition to a neutral condition (0), and the estimation data outputted from the thermal sensation estimator 103b indicates that the thermal sensation has shifted from a neutral condition (0) to a hot condition, the multi-user thermal sensation processor 105 determines that the integrated estimation data indicates that the thermal sensation has shifted from a neutral condition (0) to a hot condition. In the case where the estimation data outputted from the thermal sensation estimator 103a indicates that the thermal sensation has shifted from a hot condition to a neutral condition (0), and the estimation data outputted from the thermal sensation estimator 103b indicates that the thermal sensation has shifted from a neutral condition (0) to a cold condition, the multi-user thermal sensation processor 105 determines that the integrated estimation data indicates that the thermal sensation has shifted from a neutral condition (0) to a cold condition. Then, the multi-user thermal sensation processor 105 outputs the integrated thermal sensation estimation data to the stimulation controller 104 (Step S37).

Referring back to FIG. 2, the stimulation controller 104 determines control contents of the stimulation generator 300, based on the integrated thermal sensation estimation data outputted from the multi-user thermal sensation processor 105 (Step S5). In the case where the integrated thermal sensation estimation data indicates that the thermal sensation has shifted from a cold condition to a neutral condition (0), or from a hot condition to a neutral condition (0), or from a cold or hot condition to a neutral condition (0), in other words, in the case where the integrated thermal sensation estimation data indicates an improved condition, the control contents currently set in the stimulation generator 300 is proper. Accordingly, the thermal sensations of the users remain substantially unchanged, and are approximated to (0) for a while. Thus, in the case where the integrated thermal sensation estimation result indicates an improved condition, the stimulation controller 104 retains the currently set control contents.

In the case where the integrated thermal sensation estimation data indicates that the thermal sensation has shifted from a neutral condition (0) to a cold condition, or from a neutral condition (0) to a hot condition, in other words, in the case where the integrated thermal sensation estimation data indicates a deteriorated condition, the user's thermal sensation will be shifted to a deteriorated condition unless the control contents of the stimulation generator 300 is changed. In view of this, the stimulation controller 104 changes the currently set control contents so that the integrated thermal sensation estimation result indicates an improved condition. Specifically, in the case where the integrated thermal sensation estimation data indicates that the thermal sensation has shifted from a neutral condition (0) to a cold condition, the stimulation controller 104 determines the control contents to decrease the cooling performance when the air-conditioning is operated to cool the room, and determines the control contents to increase the warming performance when the air-conditioning is operated to warm the room. On the other hand, in the case where the integrated thermal sensation estimation data indicates that the thermal sensation has shifted from a neutral condition (0) to a hot condition, the stimulation controller 104 determines the control contents to increase the cooling performance when the air-conditioning is operated to cool the room, and determines the control contents to decrease the warming performance when the air-conditioning is operated to warm the room.

Figure 8:
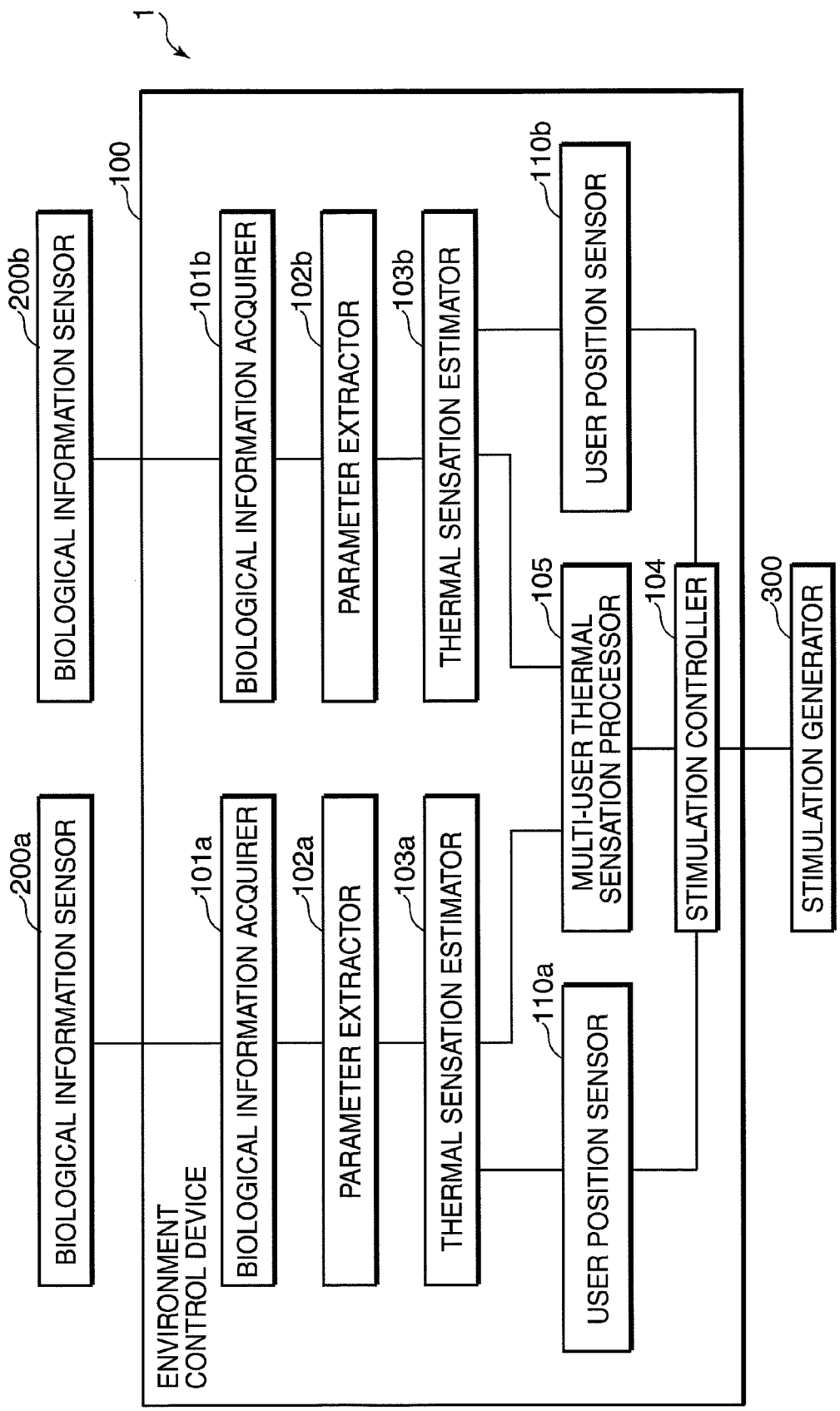
FIG. 8 is a block diagram showing a configuration in the case where a user position detector is provided in the environment control device in the first embodiment of the invention.

In the case where the integrated thermal sensation estimation data indicates that the thermal sensation has shifted from a neutral condition (0) to a cold or hot condition, in other words, in the case where the users are constituted of a user whose thermal sensation has shifted to a deteriorated condition e.g. from a neutral condition to a cold condition, and a user whose thermal sensation has shifted to a deteriorated condition e.g. from a neutral condition to a hot condition, it is difficult to satisfy both of the users whose thermal sensation has deteriorated to a cold condition and a hot condition by making a space where both of the users stay into a uniform thermal environment. In view of this, for instance, as shown in FIG. 8, user position detectors 110a and 110b are additionally provided to detect the positions of the users and output the detection results on the users' positions to the stimulation controller 104. The user position detector 110a detects the position of the user A in the space where the stimulation generator 300 is installed, and outputs the detection result on the position of the user A to the stimulation controller 104. The user position detector 110b detects the position of the user B in the space where the stimulation generator 300 is installed, and outputs the detection result on the position of the user B to the stimulation controller 104. The user position detectors 110a and 110b correspond to an example of a position detecting section.

For instance, each of the users may carry an infrared tag for outputting infrared light including ID information for specifying the user. The user position detector 110a, 110b specifies the user based on the ID information included in the infrared light, and specifies the position of the user in the space where the stimulation generator 300 is installed.

The stimulation controller 104 performs stimulation control i.e. determines the control contents so that the stimulation generator 300 is operative to blow the cool air toward the user whose thermal sensation is shifted to a deteriorated condition e.g. to a hot condition when the air-conditioning is operated to cool the room, or determines the control contents so that the stimulation generator 300 is operative to blow the warm air toward the user whose thermal sensation is shifted to a deteriorated condition e.g. to a cold condition when the air-conditioning is operated to warm the room. In this way, the stimulation controller 104 changes the air blowing direction and the air blowing rate of the stimulation generator 300 depending on the individual users in such a manner that the thermal sensations of the users are improved.

In FIG. 8, the user position detectors 110a and 110b are provided individually for the users. Alternatively, a single user position detector 110 may be provided for detecting the positions of the users. In this embodiment, the integration operation is described based on the premise that the users are two people. The embodiment is applicable to a case that the users are three or more people.

According to another user position detecting method, a pressure sensor for detecting a floor pressure, and a pulse rate sensor for detecting a pulse rate of a user are mounted on a floor surface in a space where the stimulation generator 300 is installed. Then, the user position detector 110 specifies the position where the floor pressure is detected in the space where the stimulation generator 300 is installed. The user position detector 110 also detects the pulse rate of the user by the pulse rate sensor mounted on the floor surface where the floor pressure has been detected. Thereafter, the user position detector 110 judges whether the pulse rate of the user acquired as biological information coincides with the pulse rate detected by the pulse rate sensor to specify the user.

In this way, stimulations to be applied to the users are generated, and time-series data of biological information on the users are acquired. Subsequently, the acquired time-series data are analyzed, a parameter which is changed with a lapse of time is extracted, and statuses of the users to the stimulations are estimated based on the extracted parameter. Then, the estimation results on the users are integrated into a single estimation result. The stimulation generator 300 is controlled based on the integrated estimation result. Also, thermal sensations to be applied to the users are generated. Pulse waves of the users are used as biological information. Estimation is made as to whether the user's thermal sensation to the thermal stimulation is in a first status indicating that the user's thermal sensation is shifted from a cold condition to a neutral condition, a second status indicating that the user's thermal sensation is shifted from a hot condition to a neutral condition, a third status indicating that the user's thermal sensation is shifted from a neutral condition to a hot condition, or a fourth status indicating that the user's thermal sensation is shifted from a neutral condition to a cold condition, based on the extracted parameter, with respect to each of the users.

In the above arrangement, in the case where plural users stay or reside in a common space, the statuses of the users are estimated based on a parameter which is changed with a lapse of time. This enables to estimate the users' statuses, considering individual differences on biological information, without using an absolute value of a biological information parameter which may differ among individuals, and properly control the stimulation generator 300 based on the estimated users' statuses.

Also, there are extracted a first parameter whose value is increased, as a thermal sensation is shifted from a cold condition to a neutral condition and then to a hot condition; and a second parameter which has a minimal value when the thermal sensation indicates a neutral condition, whose value is increased, as the thermal sensation is shifted from a neutral condition to a cold condition, and whose value is increased, as the thermal sensation is shifted from a neutral condition to a hot condition. Then, estimation is made as to whether the user's thermal sensation to the thermal stimulation is in the first status indicating that the thermal sensation is shifted from a cold condition to a neutral condition, the second status indicating that the thermal sensation is shifted from a hot condition to a neutral condition, the third status indicating that the thermal sensation is shifted from a neutral condition to a hot condition, or the fourth status indicating that the thermal sensation is shifted from a neutral condition to a cold condition, based on combination of the extracted first parameter and second parameter, with respect to each of the users.

In the above arrangement, estimation is made as to whether the user's thermal sensation to the thermal stimulation is in the first status indicating that the thermal sensation is shifted from a cold condition to a neutral condition, the second status indicating that the thermal sensation is shifted from a hot condition to a neutral condition, the third status indicating that the thermal sensation is shifted from a neutral condition to a hot condition, or the fourth status indicating that the thermal sensation is shifted from a neutral condition to a cold condition, with respect to each of the users. This enables to estimate the thermal sensations of the users, thereby enabling to properly control the stimulation generator 300 based on the estimated thermal sensations of the users.

Further, the pulse wave height maximum value and the maximum Lyapunov index are extracted by analyzing the time-series pulse wave data, and a change (differential value) with time in the extracted pulse wave height maximum value, and a change (differential value) with time in the extracted maximum Lyapunov index are calculated. In the case where the pulse wave height maximum value is increased and the maximum Lyapunov index is decreased, the user's thermal sensation is estimated to be in the first status. In the case where the pulse wave height maximum value is decreased and the maximum Lyapunov index is decreased, the user's thermal sensation is estimated to be in the second status. In the case where the pulse wave height maximum value is increased and the maximum Lyapunov index is increased, the user's thermal sensation is estimated to be in the third status.

In the case where the pulse wave height maximum value is decreased and the maximum Lyapunov index is increased, the user's thermal sensation is estimated to be in the fourth status. This enables to accurately estimate the thermal sensations of the users, based on the change with time in the pulse wave height maximum value, and the change with time in the maximum Lyapunov index.

Further, selection of one of the estimation results indicating that the thermal sensations correspond to the third status and the fourth status, in other words, selection of the estimation result on the user whose thermal sensation is shifted to a deteriorated condition is prioritized. This enables to properly control the stimulation generator 300 based on the thermal sensations of the users, even if the users stay or reside in a common space.

In this embodiment, the thermal sensation estimator 103a, 103b estimates the user's thermal sensation based on the differential value Δhmax of the pulse wave height maximum value, and the differential value Δλ of the maximum Lyapunov index. Alternatively, the user's thermal sensation may be estimated based on a differential value of a wave height maximum value (or an amplitude) in an accelerated pulse wave obtained by second-order derivation of pulse wave, a differential value of "b/a", a differential value of "d/a", a differential value of "e/a", as a ratio of waveform component in the accelerated pulse wave, a differential value of pulse rate, or a differential value of trajectory parallel measure (TPM) indicating random trajectory in chaos analysis, in place of the differential value Δhmax of the pulse wave height maximum value; and a differential value of "c/a", as an accelerated pulse wave parameter in an accelerated pulse wave obtained by second-order derivation of pulse wave, in place of the differential value Δλ of the maximum Lyapunov index.

The multi-user thermal sensation processor 105 prioritizes selection of an estimation result on a living body whose thermal sensation is in either one of the third status indicating that the thermal sensation is shifted from a neutral condition to a hot condition, and the fourth status indicating that the thermal sensation is shifted from a neutral condition to a cold condition. Alternatively, the multi-user thermal sensation processor 105 may prioritize selection of an estimation result obtained most frequently among multiple estimation results, based on the majority principle. For instance, in the case where ten users stay or reside in a common space, and thermal sensation estimation data on six users out of ten indicate that the thermal sensation is shifted from a neutral condition (0) to a cold condition, and thermal sensation estimation data on four users out of ten indicate that the thermal sensation is shifted from a hot condition to a neutral condition (0), the multi-user thermal sensation processor 105 integrates these thermal sensation estimation data into single integrated thermal sensation data indicating that the thermal sensation is shifted from a neutral condition (0) to a cold condition. In the case where there exist two or more most-frequently-obtained estimation results, the multi-user thermal sensation processor 105 may select one of the estimation results at random, or may prioritize selection of the estimation result indicating that the thermal sensation is shifted to a deteriorated condition.

Second Embodiment

Figure 9:
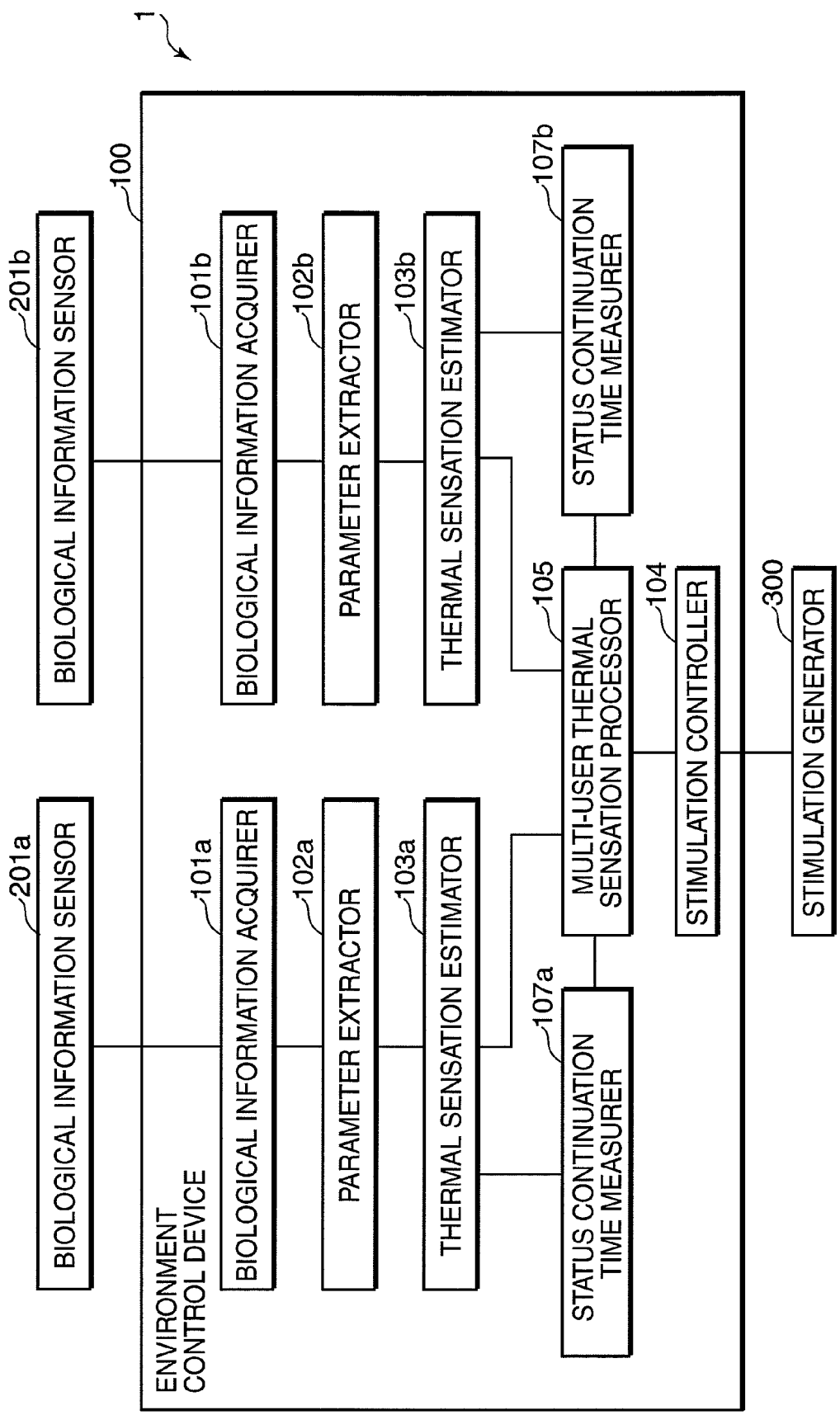
FIG. 9 is a block diagram showing a configuration of an environment control system in a second embodiment of the invention.

FIG. 9 is a block diagram showing a configuration of an environment control system in the second embodiment of the invention. In FIG. 9, constituent elements identical to those in FIG. 1 are indicated with the same reference numerals, and description thereof is omitted herein.

Referring to FIG. 9, an environment control device 100 additionally includes status continuation time measurers 107a and 107b. Upon receiving an estimation result (indicating that the thermal sensation is shifted from a cold condition to a neutral condition (0), or from a hot condition to a neutral condition (0), or from a neutral condition (0) to a cold condition, or from a neutral condition (0) to a hot condition) from a thermal sensation estimator 103a, 103b, the status continuation time measurer 107a, 107b measures a time when an identical estimation result among the above estimation results is continuously outputted to output a status continuation time indicating the measured time when the identical estimation result is continuously outputted to a multi-user thermal sensation processor 105. In this embodiment, the status continuation time measurers 107a and 107b correspond to an example of a status continuation time measuring section.

Figure 10:
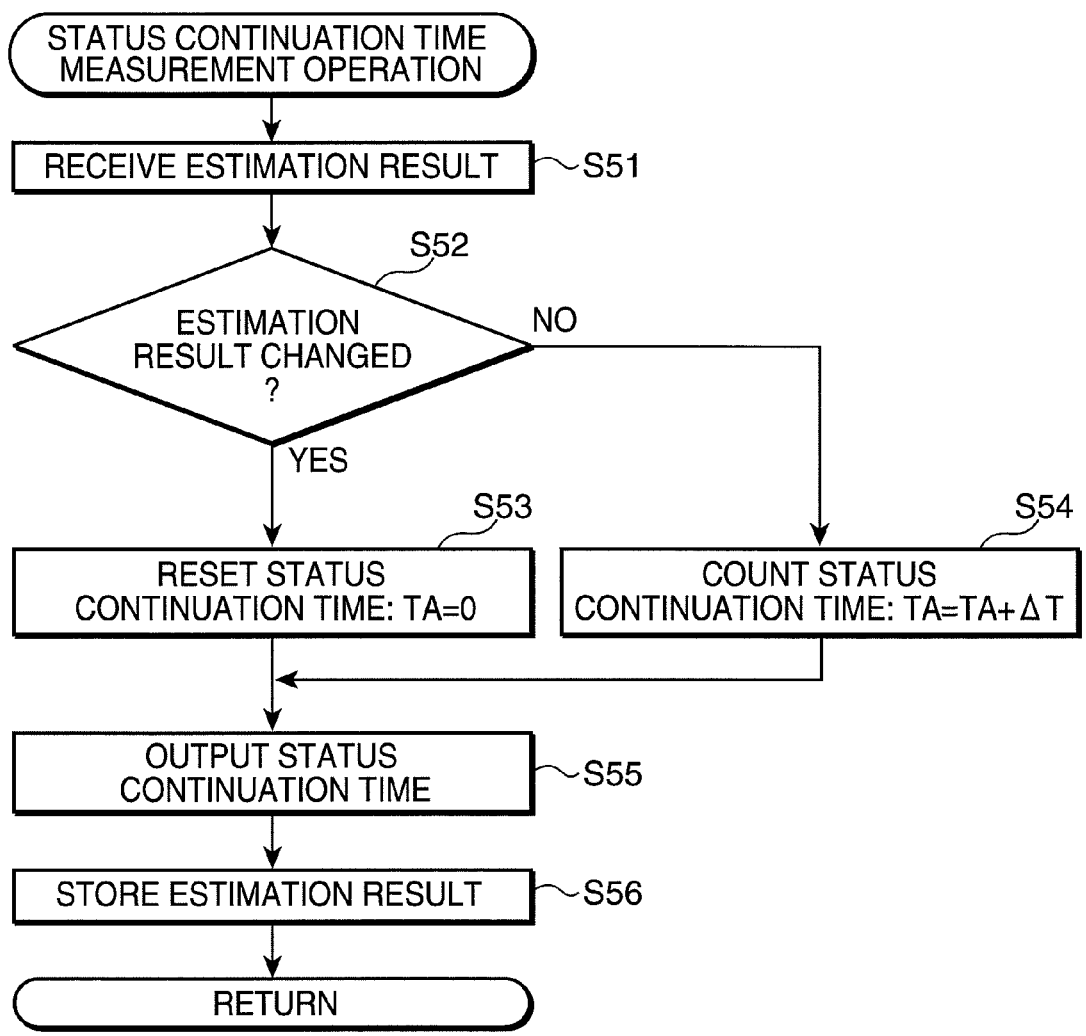
FIG. 10 is a flowchart showing a flow of a status continuation time measurement operation to be performed by a status continuation time measurer in the second embodiment of the invention.

FIG. 10 is a flowchart showing a flow of a status continuation time measurement operation to be performed by the status continuation time measurer 107a. The operation shown in FIG. 10 is performed between the operation of Step S3 and the operation of Step S4 in FIG. 2. First, the status continuation time measurer 107a receives a thermal sensation estimation result on the user A estimated by the thermal sensation estimator 103a (Step S51). Subsequently, the status continuation time measurer 107a compares the currently received thermal sensation estimation result with a previously received thermal sensation estimation result (Step S52). If a change between the received thermal sensation estimation results is detected (YES in Step S52), the status continuation time measurer 107a resets a status continuation time TA of the thermal sensation estimation result (TA=0) (Step S53). The status continuation time measurer 107a receives, from the thermal sensation estimator 103a, the thermal sensation estimation result every predetermined time interval ΔT.

If, on the other hand, a change between the received thermal sensation estimation results is not detected (NO in Step S52), the status continuation time measurer 107a measures the status continuation time TA of the thermal sensation estimation result (TA=TA+ΔT, where ΔT is a lapse of time from the point of time when the previous thermal sensation estimation result is outputted) (Step S54). Then, the status continuation time measurer 107a outputs the measured status continuation time TA to the multi-user thermal sensation processor 105 (Step S55).

Then, the status continuation time measurer 107a stores the currently received thermal sensation estimation result in preparation for a succeeding status continuation time measurement operation (Step S56). The operation shown in FIG. 10 is performed with respect to the user B in the similar manner as mentioned above, and the status continuation time measurer 107b measures a status continuation time TB indicating a time when an identical thermal sensation estimation result on the user B is continuously outputted, and outputs the measured status continuation time TB to the multi-user thermal sensation processor 105.

Figure 11:
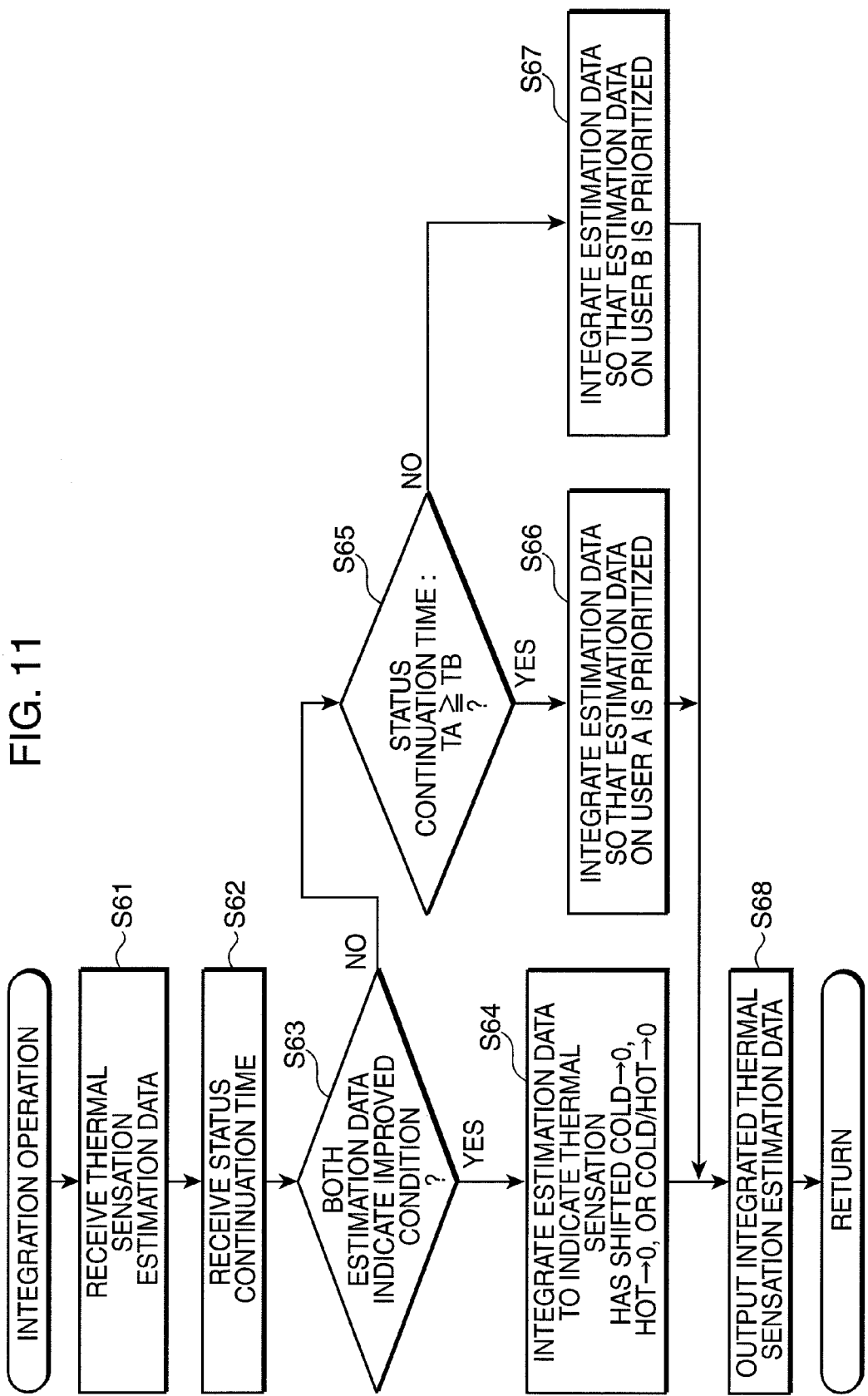
FIG. 11 is a flowchart showing a flow of an integration operation to be performed by a multi-user thermal sensation processor in the second embodiment of the invention.

In the following, an integration operation to be performed by the multi-user thermal sensation processor 105 in the second embodiment is described. FIG. 11 is a flowchart showing a flow of the integration operation to be performed by the multi-user thermal sensation processor 105 in the second embodiment. First, the multi-user thermal sensation processor 105 receives thermal sensation estimation data indicating estimation on a thermal sensation of the user A from the thermal sensation estimator 103a, and receives thermal sensation estimation data indicating estimation on a thermal sensation of the user B from the thermal sensation estimator 103*b* (Step S61).

Then, the multi-user thermal sensation processor 105 receives the status continuation time TA on the user A from the status continuation time measurer 107*a*, and receives the status continuation time TB on the user B from the status continuation time measurer 107*b* (Step S62). Thereafter, the multi-user thermal sensation processor 105 compares the status continuation time TA on the user A with the status continuation time TB on the user B, and integrates the two thermal sensation estimation data into single thermal sensation estimation data so that control of the thermal sensation of the user with a longer status continuation time indicating continuation of the identical thermal sensation is prioritized.

FIG. 12 is a diagram showing a table for describing the integration operation on thermal sensation estimation data shown in FIG. 11. The multi-user thermal sensation processor 105 integrates the thermal sensation estimation data on the user A and the user B in such a manner that control of the thermal sensation of the user with a longer status continuation time indicating continuation of the identical thermal sensation is prioritized, based on combination of the thermal sensation estimation data on the user A and the thermal sensation estimation data on the user B respectively estimated by the thermal sensation estimators 103*a* and 103*b*, and the status continuation time TA on the user A and the status continuation time TB on the user B respectively measured by the status continuation time measurers 107*a* and 107*b*. In other words, the multi-user thermal sensation processor 105 judges whether both of the thermal sensation estimation data on the user A and the user B indicate an improved condition (in other words, a thermal sensation is shifted from a cold condition to a neutral condition (0), or from a hot condition to a neutral condition (0)) (Step S63).

In the case where both of the thermal sensation estimation data on the user A and the user B respectively estimated by the thermal sensation estimators 103*a* and 103*b* indicate an improved condition (in other words, a thermal sensation is shifted from "cold" to a neutral condition (0), or from a hot condition to a neutral condition (0)) (YES in Step S63), the multi-user thermal sensation processor 105 integrates these two thermal sensation estimation data into single thermal sensation estimation data indicating that the thermal sensation has shifted from a cold condition to a neutral condition (0), or from a hot condition to a neutral condition (0), or from a cold or hot condition to a neutral condition (0) (Step S64). For instance, as shown in FIG. 12, in the case where the estimation data from the thermal sensation estimator 103*a* indicates that the thermal sensation has shifted from a cold condition to a neutral condition (0), and the estimation data from the thermal sensation estimator 103*b* indicates that the thermal sensation has shifted from a cold condition to a neutral condition (0), the multi-user thermal sensation processor 105 determines that the integrated estimation data indicates that the thermal sensation has shifted from a cold condition to a neutral condition (0). In the case where the estimation data from the thermal sensation estimator 103*a* indicates that the thermal sensation has shifted from a cold condition to a neutral condition (0), and the estimation data from the thermal sensation estimator 103*b* indicates that the thermal sensation has shifted from a hot condition to a neutral condition (0), the multi-user thermal sensation processor 105 determines that the integrated estimation data indicates that the thermal sensation has shifted from a cold or hot condition to a neutral condition (0). Then, the multi-user thermal sensation processor 105 outputs the integrated thermal sensation estimation data to a stimulation controller 104 (Step S68).

In the case where it is judged that both of the thermal sensation data on the user A and the user B respectively estimated by the thermal sensation estimators 103*a* and 103*b* do not indicate an improved condition (indicating that the thermal sensation has shifted from a cold condition to a neutral condition (0), or from a hot condition to a neutral condition (0)), or either one of the thermal sensation estimation data on the user A and the user B does not indicate an improved condition (NO in Step S63), the multi-user thermal sensation processor 105 compares the status continuation time TA on the user A with the status continuation time TB on the user B (Step S65). In the case where it is judged that the status continuation time TA on the user A is equal to or longer than the status continuation time TB on the user B (YES in Step S65), the multi-user thermal sensation processor 105 integrates these two thermal sensation estimation data in such a manner that the thermal sensation estimation data on the user A is prioritized (Step S66).

In the case where it is judged that the status continuation time TA on the user A is shorter than the status continuation time TB on the user B (NO in Step S65), the multi-user thermal sensation processor 105 integrates these two thermal sensation estimation data in such a manner that the thermal sensation estimation data on the user B is prioritized (Step S67).

For instance, as shown in FIG. 12, in the case where the estimation data from the thermal sensation estimator 103*a* indicates that the thermal sensation has shifted from a cold condition to a neutral condition (0), and the estimation data from the thermal sensation estimator 103*b* indicates that the thermal sensation has shifted from a neutral condition (0) to a hot condition, the multi-user thermal sensation processor 105 compares the status continuation time TA on the user A with the status continuation time TB on the user B. In this embodiment, in the case where it is judged that the status continuation time TA on the user A is equal to or longer than the status continuation time TB on the user B, the multi-user thermal sensation processor 105 determines that the integrated estimation data indicates that the thermal sensation has shifted from a cold condition to a neutral condition (0). On the other hand, in the case where it is judged that the status continuation time TA on the user A is shorter than the status continuation time TB on the user B, the multi-user thermal sensation processor 105 determines that the integrated estimation data indicates that the thermal sensation has shifted from a neutral condition (0) to a hot condition. Then, the multi-user thermal sensation processor 105 outputs the integrated thermal sensation estimation data to the stimulation controller 104 (Step S68).

Then, the stimulation controller 104 determines the control contents of a stimulation generator 300 based on the integrated thermal sensation estimation data outputted from the multi-user thermal sensation processor 105. In the case where the integrated thermal sensation estimation data indicates that the thermal sensation has shifted from a cold condition to a neutral condition (0), or from a hot condition to a neutral condition (0), or from a cold or hot condition to a neutral condition (0), in other words, in the case where the integrated thermal sensation estimation data indicates an improved condition, the control contents currently set in the stimulation generator 300 is proper. Accordingly, the thermal sensations of the users remain substantially unchanged, and are approximated to (0) for a while. Thus, in the case where the integrated thermal sensation estimation data indicates an improved condition, the stimulation controller 104 retains the currently set control contents.

In the case where the integrated thermal sensation estimation data indicates that the thermal sensation has shifted from a neutral condition (0) to a cold condition, or from a neutral condition (0) to a hot condition, in other words, in the case where the integrated thermal sensation estimation data indicates a deteriorated condition, the user's thermal sensation will be shifted to a deteriorated condition unless the currently set control contents of the stimulation generator 300 is changed. Accordingly, the stimulation controller 104 changes the currently set control contents so that the integrated thermal sensation estimation data indicates an improved condition. Specifically, in the case where the integrated thermal sensation estimation data indicates that the thermal sensation has shifted from a neutral condition (0) to a cold condition, the stimulation controller 104 determines the control contents to decrease the cooling performance when the air-conditioning is operated to cool the room, and determines the control contents to increase the warming performance when the air-conditioning is operated to warm the room. On the other hand, in the case where the integrated thermal sensation estimation data indicates that the thermal sensation has shifted from a neutral condition (0) to a hot condition, the stimulation controller 104 determines the control contents to increase the cooling performance when the air-conditioning is operated to cool the room, and determines the control contents to decrease the warming performance when the air-conditioning is operated to warm the room.

In the case where the integrated thermal sensation estimation data indicates that the thermal sensation has shifted from a neutral condition (0) to a cold or hot condition, in other words, in the case where the users are constituted of a user whose thermal sensation has shifted to a deteriorated condition e.g. from a neutral condition to a cold condition, and a user whose thermal sensation has shifted to a deteriorated condition e.g. from a neutral condition to a hot condition, it is difficult to satisfy both of the users whose thermal sensation has deteriorated to a cold condition and a hot condition by making a space where both of the users stay into a uniform thermal environment. However, prioritizing the thermal sensation estimation data of the user indicating that the thermal sensation is shifted to a deteriorated condition for a longer time is advantageous in avoiding likelihood that a specific user may be exposed to an uncomfortable condition for a long time.

As described above, the status continuation time measurer 107a, 107b measures the time when an identical condition is continued among the estimation results (indicating the aforementioned first through the fourth statuses) from the thermal sensation estimator 103a, 103b, and selection of the estimation result on the user having a longest status continuation time to be measured by the status continuation time measurer 107a, 107b is prioritized. This enables to properly control the stimulation generator 300 such as an air-conditioning system constituting a residential environment, based on the thermal sensations of the users, even if the users stay or reside in a common space, and avoid likelihood that a specific user may be exposed to an uncomfortable condition for a long time.

In the second embodiment, the status continuation time measurer 107a, 107b measures a time when an identical condition is continued among the estimation results (indicating the aforementioned first through the fourth statuses) from the thermal sensation estimator 103a, 103b. Alternatively, it is possible to measure a time when the first status (indicating that the thermal sensation is shifted from a cold condition to a neutral condition) or the fourth status (indicating that the thermal sensation is shifted from a neutral condition to a cold condition) is continued, or a time when the second status (indicating that the thermal sensation is shifted from a hot condition to a neutral condition) or the third status (indicating that the thermal sensation is shifted from a neutral condition to a hot condition) is continued. The above measurement is advantageous in avoiding likelihood that the user may be exposed to a cold or hot condition from a neutral condition for a long time.

Third Embodiment

Figure 13:
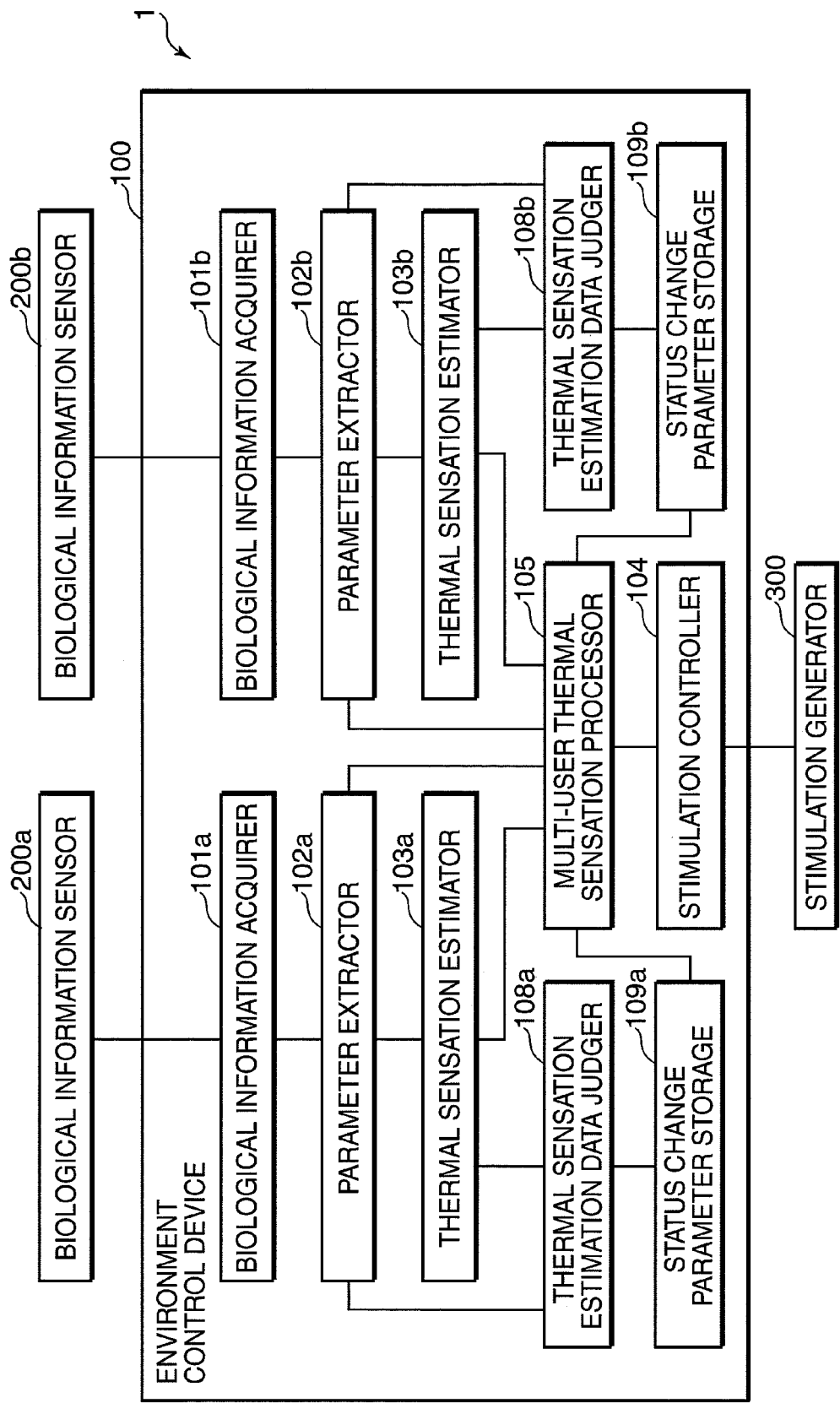
FIG. 13 is a block diagram showing a configuration of an environment control system in a third embodiment of the invention.

FIG. 13 is a block diagram showing a configuration of an environment control system in the third embodiment of the invention. In FIG. 13, constituent elements identical to those in FIG. 1 are indicated with the same reference numerals, and description thereof is omitted herein.

Referring to FIG. 13, an environment control device 100 additionally includes thermal sensation estimation data judgers 108a and 108b, and status change parameter storages 109a and 109b. The thermal sensation estimation data judger 108a, 108b judges whether the user's thermal sensation has shifted from a hot condition to a neutral condition (0) and then to a cold condition, or from a cold condition to a neutral condition (0) and then to a hot condition, based on user's thermal sensation estimation data from a thermal sensation estimator 103a, 103b, and thermal sensation estimation data which is obtained by a previous estimation stored in the status change parameter storage 109a, 109b.

The status change parameter storage 109a, 109b receives an estimation result of the thermal sensation estimator 103a, 103b (indicating that the thermal sensation is shifted from a cold condition to a neutral condition (0) or from a hot condition to a neutral condition (0), or from a neutral condition (0) to a cold condition, or from a neutral condition (0) to a hot condition), and a biological information parameter extracted by a parameter extractor 102a, 102b. The status change parameter storage 109a stores a parameter PA0 extracted by the parameter extractor 102a, in the case where the estimation result of the thermal sensation estimator 103a indicates that the thermal sensation has shifted from a cold condition to a neutral condition (0) and then to a hot condition, or from a hot condition to a neutral condition (0) and then to a cold condition. In this embodiment, the parameter to be stored in the status change parameter storage 109a, 109b is a pulse wave height maximum value. The status change parameter storage 109b stores a parameter PB0 extracted by the parameter extractor 102b, in the case where the estimation result of the thermal sensation estimator 103b indicates that the thermal sensation has shifted from a cold condition to a neutral condition (0) and then to a hot condition, or from a hot condition to a neutral condition (0) and then to a cold condition.

A multi-user thermal sensation processor 105 compares an absolute value |PA−PA0| of variation between the parameter PA0 stored in the status change parameter storage 109a, and a current parameter PA extracted by the parameter extractor 102a, with an absolute value |PB−PB0| of variation between the parameter PB0 stored in the status change parameter storage 109b, and a current parameter PB extracted by the parameter extractor 102b, integrates thermal sensation estimation data on the users in such a manner that the user having a larger absolute value is prioritized, and outputs the integration result to a stimulation controller 104. In this embodiment, the status change parameter storages 109a and 109b correspond to an example of a parameter storing section.

Figure 14:
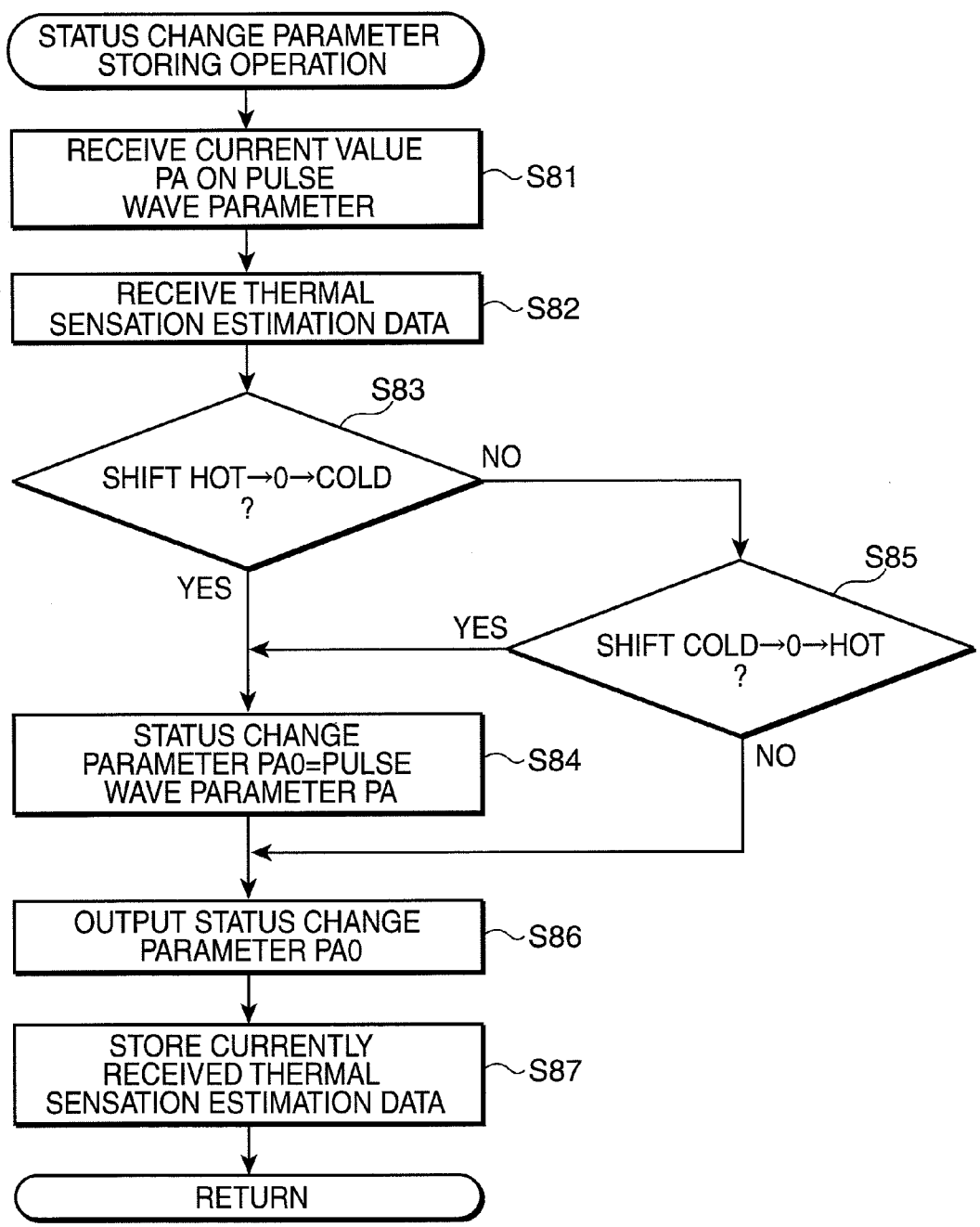
FIG. 14 is a flowchart showing a flow of a status change parameter storing operation to be performed by a thermal sensation estimation data judger and a status change parameter storage in the third embodiment of the invention.

FIG. 14 is a flowchart showing a flow of a status change parameter storing operation to be performed by the thermal sensation estimation data judger 108a and the status change parameter storage 109a in the third embodiment. The operation shown in FIG. 14 is conducted between the operation of Step S3 and the operation of Step S4 in FIG. 2. First, the thermal sensation estimation data judger 108a receives a pulse wave parameter PA on the current user A from the parameter extractor 102a (Step S81). Then, the thermal sensation estimation data judger 108a receives thermal sensation estimation data on the user A from the thermal sensation estimator 103a (Step S82).

Then, the thermal sensation estimation data judger 108a judges whether the thermal sensation of the user A has shifted from a hot condition to a neutral condition (0) and then to a cold condition, based on the thermal sensation estimation data on the user A from the thermal sensation estimator 103a, and the previously-obtained thermal sensation estimation data stored in the status change parameter storage 109a (Step S83). In the case where it is judged that the thermal sensation of the user A has shifted from a hot condition to a neutral condition (0) and then to a cold condition (YES in Step S83), the thermal sensation estimation data judger 108a stores the currently-received pulse wave parameter PA into the status change parameter storage 109a, as the status change parameter PA0 (Step S84).

On the other hand, in the case where it is judged that the thermal sensation of the user A has not shifted from a hot condition to a neutral condition (0) and then to a cold condition (NO in Step S83), the thermal sensation estimation data judger 108a judges whether the thermal sensation of the user A has shifted from a cold condition to a neutral condition (0) and then to a hot condition (Step S85). In the case where it is judged that the thermal sensation of the user A has shifted from a cold condition to a neutral condition (0) and then to a hot condition (YES in Step S85), the thermal sensation estimation data judger 108a stores the currently-received pulse wave parameter PA into the status change parameter storage 109a, as the status change parameter PA0 (Step S84). In the case where it is judged that the thermal sensation of the user A has not shifted from a cold condition to a neutral condition (0) and then to a hot condition (NO in Step S85), the thermal sensation estimation data judger 108a proceeds to Step S86, without updating the status change parameter.

Thereafter, the status change parameter storage 109a outputs the status change parameter PA0 to the multi-user thermal sensation processor 105 (Step S86). Then, the thermal sensation estimation data judger 108a stores the currently-received thermal sensation estimation data into the status change parameter storage 109a (Step S87). The operation shown in FIG. 14 is performed with respect to the user B in the similar manner as mentioned above, and the status change parameter storage 109b stores the status change parameter PB0 of the user B to output the status change parameter PB0 to the multi-user thermal sensation processor 105.

Figure 15:
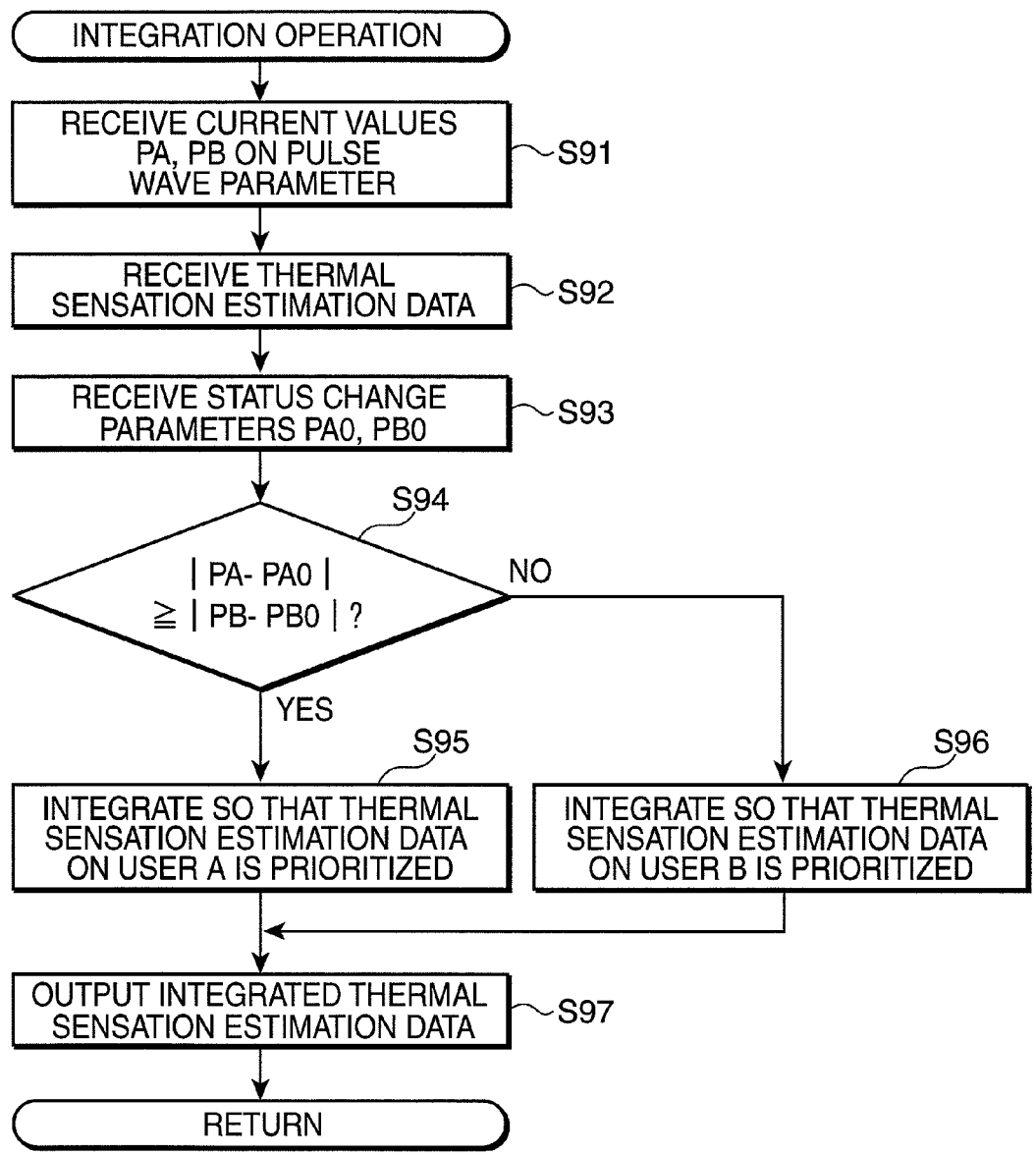
FIG. 15 is a flowchart showing a flow of an integration operation to be performed by a multi-user thermal sensation processor in the third embodiment of the invention.
Figure 16:
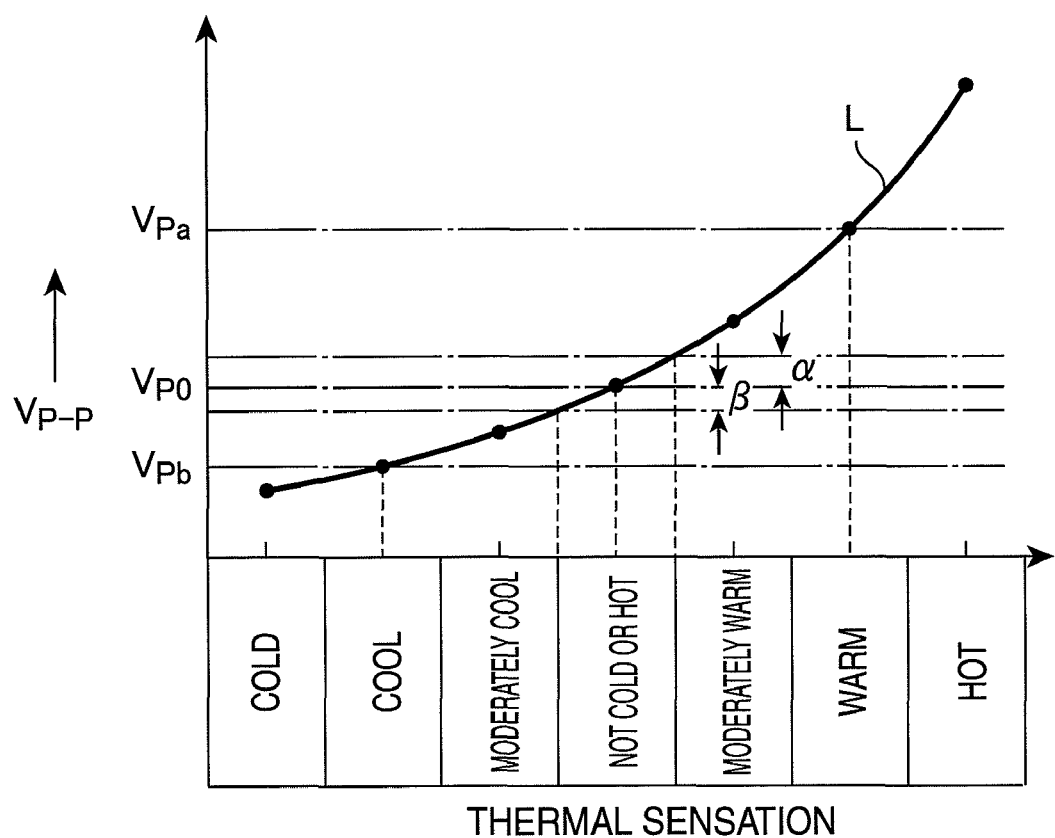
FIG. 16 is a diagram corresponding to FIG. 5 recited in patent document 1.

In the following, an integration operation to be performed by the multi-user thermal sensation processor 105 in the third embodiment is described. FIG. 15 is a flowchart showing a flow of the integration operation to be performed by the multi-user thermal sensation processor 105 in the third embodiment. First, the multi-user thermal sensation processor 105 receives the current pulse wave parameters PA and PB on the user A and the user B from the parameter extractor 102a and 102b, respectively (Step S91). Then, the multi-user thermal sensation processor 105 receives the thermal sensation estimation data on the user A and the user B from the thermal sensation estimators 103a and 103b, respectively (Step S92). Then, the multi-user thermal sensation processor 105 receives the status change parameters PA0 and PB0 on the user A and the user B from the status change parameter storages 109a and 109b, respectively (Step S93).

Then, the multi-user thermal sensation processor 105 compares an absolute value |PA−PA0| of variation between the status change parameter PA0 stored in the status change parameter storage 109a, and the current pulse wave parameter PA extracted by the parameter extractor 102a, with an absolute value |PB−PB0| of variation between the status change parameter PB0 stored in the status change parameter storage 109b, and the current pulse wave parameter PB extracted by the parameter extractor 102b (Step S94). In the case where it is judged that the value |PA−PA0| is equal to or larger than the value |PB−PB0| (YES in Step S94), the multi-user thermal sensation processor 105 integrates thermal sensation estimation data on the users in such a manner that the thermal sensation estimation data on the user A is prioritized (Step S95).

On the other hand, in the case where it is judged that the value |PA−PA0| is smaller than the value |PB−PB0| (NO in Step S94), the multi-user thermal sensation processor 105 integrates thermal sensation estimation data on the users in such a manner that the thermal sensation estimation data on the user B is prioritized (Step S96). Thereafter, the multi-user thermal sensation processor 105 outputs the integrated thermal sensation estimation data to the stimulation controller 104 (Step S97).

As described above, the status change parameter storage 109a, 109b is operative to store the parameter extracted when the estimation result indicates that the thermal sensation has shifted from a cold condition to a neutral condition, and then to a hot condition with respect to each of the users, and store the parameter extracted when the estimation result indicates that the thermal sensation has shifted from a hot condition to a neutral condition, and then to a cold condition with respect to each of the users. Then, the multi-user thermal sensation processor 105 compares an absolute value of variation between the parameter stored in the status change parameter storage 109a, and the current parameter extracted by the parameter extractor 102a, with an absolute value of variation between the parameter stored in the status change parameter storage 109b, and the current parameter extracted by the parameter extractor 102b, with respect to each of the users, and selection of the estimation result on the user having a largest absolute value is prioritized.

In this way, stored is a parameter extracted when the estimation result indicates that the thermal sensation has shifted from a cold condition to a neutral condition, and then to a hot condition, or a parameter extracted when the estimation result indicates that the thermal sensation has shifted from a hot condition to a neutral condition, and then to a cold condition. In other words, parameters extracted when the thermal sensations of the users are substantially (0) are stored as reference values, respectively. Then, the absolute value of variation between the stored parameter and the current parameter is compared with respect to each of the users. This enables to suppress an influence of variation by individual differences on the parameter. Also, a user having a larger absolute value of variation between the current parameter and the reference value (stored parameter) is estimated to have a larger shift in thermal sensation from a neutral condition to a cold or hot condition. Accordingly, the stimulation generator can be properly controlled based on the thermal sensation of the user who feels colder or hotter than the other user, thereby enabling to avoid likelihood that a specific user may be exposed to an uncomfortable condition.

In this embodiment, the multi-user thermal sensation processor 105 compares an absolute value |PA−PA0| of variation between the parameter PA0 stored in the status change parameter storage 109a, and a current parameter PA extracted by the parameter extractor 102a, with an absolute value |PB−PB0| of variation between the parameter PB0 stored in the status change parameter storage 109b, and a current parameter PB extracted by the parameter extractor 102b. Alternatively, the multi-user thermal sensation processor 105 may compare a ratio |PA−PA0|/|PA0| i.e. a ratio of the absolute value |PA−PA0| of variation to the absolute value |PA0| of the parameter PA0, with a ratio |PB−PB0|/|PB0| i.e. a ratio of the absolute value |PB−PB0| of variation to the absolute value |PB0| of the parameter PB0. In the modification, even if a variation by individual differences on the pulse wave parameter is large, thermal sensations of the users can be more properly integrated.

In the case where the pulse wave parameter is e.g. a pulse wave height maximum value, as shown in FIG. 3, the pulse wave height maximum value is increased, as the thermal sensation is shifted from a cold condition to a hot condition. The degree of increase on the pulse wave height maximum value tends to be decreased, as the thermal sensation is shifted from a cold condition to a hot condition. Accordingly, for instance, in the case where a thermal sensation estimation result estimated by the thermal sensation estimator 103a, 103b indicates that the thermal sensation is shifted from a cold condition to a neutral condition (0), or from a neutral condition (0) to a hot condition, comparison may be made by multiplying the value |PA−PA0|, |PB−PB0| by a predetermined correction coefficient (e.g. 1≦correction coefficient≦2), which is predefined considering a characteristic of the pulse wave parameter.

In the foregoing embodiments, the living body is a user (human). Alternatively, as far as biological information such as a pulse wave is obtainable, the living body may be a creature such as an animal other than the human, for instance.

In the foregoing embodiments, the stimulation generator 300 is a household air-conditioning system. Alternatively, the stimulation generator 300 may be an air-conditioning system for an automobile. In the modification, thermal sensations of the users seated in a driver's seat, a front passenger seat, a rear passenger seat, and the like are estimated. The estimation results on the users are integrated into one estimation result. The stimulation generator 300 is controlled based on the integrated estimation result. In the modification, control is described, in the case where the integrated estimation result indicates that the thermal sensation is shifted from a neutral condition (0) to a cold or hot condition, the thermal sensation estimation result on the user A seated in the driver's seat indicates that the thermal sensation is shifted from a neutral condition (0) to a cold condition, and the thermal sensation estimation result on the user B seated in the front passenger seat indicates that the thermal sensation is shifted from a neutral condition (0) to a hot condition. In this case, when the air-conditioning system is operated to cool the automobile chamber, the rate of the air to be blown toward the user A is decreased, and the rate of the air to be blown toward the user B is increased. On the other hand, when the air-conditioning system is operated to warm the automobile chamber, the rate of the air to be blown toward the user A is increased, and the rate of the air to be blown toward the user B is decreased. Providing biological information sensors individually in the seats of an automobile is advantageously in easily detecting which user is seated in which seat.

In the foregoing embodiments, the stimulation generator 300 is an air-conditioning system for generating thermal stimulations. Alternatively, the stimulation generator 300 may be an apparatus for generating stimulations other than the thermal stimulations.

The foregoing embodiments and/or modifications may primarily include the inventions having the following arrangements.

An environment control device according to an aspect of the invention comprises: a biological information acquiring section for acquiring time-series data of biological information on a plurality of living bodies applied with a stimulation; a parameter extracting section for analyzing the time-series data acquired by the biological information acquiring section to extract a parameter which is changed with a lapse of time; a living body status estimating section for estimating a status of each of the living bodies to the stimulation, based on the parameter extracted by the parameter extracting section; an integration processing section for integrating estimation results on the living bodies estimated by the living body status estimating section into a single estimation result; and a stimulation controlling section for controlling contents of the stimulation to be applied to the living bodies, based on the estimation result integrated by the integration processing section, wherein the living body status estimating section is operative to estimate whether the status of the living body to the stimulation is a status indicating a shift from an uncomfortable state to a comfortable state, or a status indicating a shift from the comfortable state to the uncomfortable state, based on the parameter extracted by the parameter extracting section, with respect to the each of the living bodies.

An environment control method according to another aspect of the invention comprises: a biological information acquiring step of acquiring time-series data of biological information on a plurality of living bodies applied with a stimulation; a parameter extracting step of analyzing the time-series data acquired in the biological information acquiring step to extract a parameter which is changed with a lapse of time; a living body status estimating step of estimating a status of each of the living bodies to the stimulation, based on the parameter extracted in the parameter extracting step; an integration processing step of integrating estimation results on the living bodies estimated in the living body status estimating step into a single estimation result; and a stimulation controlling step of controlling contents of the stimulation to be applied to the living bodies, based on the estimation result integrated in the integration processing step, wherein the living body status estimating step is a step of estimating whether the status of the living body to the stimulation is a status indicating a shift from an uncomfortable state to a comfortable state, or a status indicating a shift from the comfortable state to the uncomfortable state, based on the parameter extracted in the parameter extracting step, with respect to the each of the living bodies.

An environment control program according to yet another aspect of the invention causes a computer to function as: biological information acquiring means for acquiring time-series data of biological information on a plurality of living bodies applied with a stimulation; parameter extracting means for analyzing the time-series data acquired by the biological information acquiring means to extract a parameter which is changed with a lapse of time; living body status estimating means for estimating a status of each of the living bodies to the stimulation, based on the parameter extracted by the parameter extracting means; integration processing means for integrating estimation results on the living bodies estimated by the living body status estimating means into a single estimation result; and stimulation controlling means for controlling contents of the stimulation to be applied to the living bodies, based on the estimation result integrated by the integration processing means, wherein the living body status estimating means is operative to estimate whether the status of the living body to the stimulation is a status indicating a shift from an uncomfortable state to a comfortable state, or a status indicating a shift from the comfortable state to the uncomfortable state, based on the parameter extracted by the parameter extracting means, with respect to the each of the living bodies.

An environment control system according to still another aspect of the invention comprises: a stimulation generating section for generating a stimulation to be applied to a plurality of living bodies; a measuring section for measuring biological information on each of the living bodies; a biological information acquiring section for acquiring time-series data of biological information on the living bodies measured by the measuring section; a parameter extracting section for analyzing the time-series data acquired by the biological information acquiring section to extract a parameter which is changed with a lapse of time; a living body status estimating section for estimating a status of the each of the living bodies to the stimulation generated by the stimulation generating section, based on the parameter extracted by the parameter extracting section; an integration processing section for integrating estimation results on the living bodies estimated by the living body status estimating section into a single estimation result; and a stimulation controlling section for controlling the stimulation generating section based on the estimation result integrated by the integration processing section, wherein the living body status estimating section is operative to estimate whether the status of the living body to the stimulation generated by the stimulation generating section is a status indicating a shift from an uncomfortable state to a comfortable state, or a status indicating a shift from the comfortable state to the uncomfortable state, based on the parameter extracted by the parameter extracting section, with respect to the each of the living bodies.

In the above arrangements, the stimulation to be applied to the living bodies is generated, and the time-series data of biological information on the living bodies applied with the stimulation are acquired. Subsequently, the acquired time-series data are analyzed, the parameter which is changed with a lapse of time is extracted, and the statuses of the living bodies to the stimulation are estimated based on the extracted parameter. Then, the estimation results on the living bodies are integrated into the single estimation result. The contents of the stimulation to be applied to the living bodies is controlled based on the integrated estimation result. Also, estimation is made as to whether the status of the living body to the stimulation is the status indicating the shift from the uncomfortable state to the comfortable state, or the status indicating the shift from the comfortable state to the uncomfortable state, based on the extracted parameter, with respect to the each of the living bodies.

In the above arrangements, in the case where plural living bodies stay or reside in a common space, the statuses of the living bodies are estimated based on the parameter which is changed with a lapse of time. This enables to estimate the statuses of the living bodies, considering individual differences on biological information, without using an absolute value of a biological information parameter which may differ among the living bodies, and properly control the stimulation contents based on the estimated statuses of the living bodies.

In the environment control device, preferably, the stimulation may include a thermal stimulation, and the living body status estimating section may be operative to estimate whether a thermal sensation of the living body to the thermal stimulation corresponds to a first status indicating that the thermal sensation is shifted from a cold condition to a neutral condition, a second status indicating that the thermal sensation is shifted from a hot condition to the neutral condition, a third status indicating that the thermal sensation is shifted from the neutral condition to the hot condition, or a fourth status indicating that the thermal sensation is shifted from the neutral condition to the cold condition, based on the parameter extracted by the parameter extracting section, with respect to the each of the living bodies.

In the above arrangement, the thermal stimulation to be applied to the living bodies is generated, and the biological information is a pulse wave of a living body. Estimation is made as to whether the thermal sensation of the living body to the thermal stimulation corresponds to the first status indicating that the thermal sensation is shifted from the cold condition to the neutral condition, the second status indicating that the thermal sensation is shifted from the hot condition to the neutral condition, the third status indicating that the thermal sensation is shifted from the neutral condition to the hot condition, or the fourth status indicating that the thermal sensation is shifted from the neutral condition to the cold condition, based on the extracted parameter, with respect to the each of the living bodies.

In the above arrangement, in the case where the living bodies stay or reside in a common space, the statuses of the living bodies to the thermal stimulation are estimated based on the parameter which is changed with a lapse of time. This enables to estimate the statuses of the living bodies, considering individual differences on biological information, without using an absolute value of a biological information parameter which may differ among the living bodies, and properly control the stimulation contents based on the estimated statuses of the living bodies.

In the environment control device, preferably, the parameter extracting section may be operative to extract a first parameter whose value is increased, as the thermal sensation is shifted from the cold condition to the neutral condition, and then to the hot condition, and a second parameter which has a minimal value when the thermal sensation corresponds to the neutral condition, whose value is increased, as the thermal sensation is shifted from the neutral condition to the cold condition, and whose value is increased, as the thermal sensation is shifted from the neutral condition to the hot condition, and the living body status estimating section may be operative to estimate whether the thermal sensation of the living body to the thermal stimulation corresponds to the first status, the second status, the third status, or the fourth status, based on combination of the first parameter and the second parameter extracted by the parameter extracting section, with respect to the each of the living bodies.

In the above arrangement, extracted are the first parameter whose value is increased, as the thermal sensation is shifted from the cold condition to the neutral condition, and then to the hot condition, and the second parameter which has a minimal value when the thermal sensation corresponds to the neutral condition, whose value is increased, as the thermal sensation is shifted from the neutral condition to the cold condition, and whose value is increased, as the thermal sensation is shifted from the neutral condition to the hot condition. Estimation is made as to whether the thermal sensation of the living body to the thermal stimulation corresponds to the first status indicating that the thermal sensation is shifted from the cold condition to the neutral condition, the second status indicating that the thermal sensation is shifted from the hot condition to the neutral condition, the third status indicating that the thermal sensation is shifted from the neutral condition to the hot condition, or the fourth status indicating that the thermal sensation is shifted from the neutral condition to the cold condition, based on combination of the extracted first and second parameters, with respect to the each of the living bodies.

In the above arrangement, estimation is made as to whether the thermal sensation of the living body to the thermal stimulation corresponds to the first status indicating that the thermal sensation is shifted from the cold condition to the neutral condition, the second status indicating that the thermal sensation is shifted from the hot condition to the neutral condition, the third status indicating that the thermal sensation is shifted from the neutral condition to the hot condition, or the fourth status indicating that the thermal sensation is shifted from the neutral condition to the cold condition, with respect to the each of the living bodies. This enables to estimate the thermal sensations of the living bodies, and properly control the stimulation contents based on the estimated thermal sensations of the living bodies.

In the environment control device, preferably, the first parameter may be a pulse wave height maximum value, the second parameter may be a maximum Lyapunov index, and the living body status estimating section may be operative to calculate a change with time in the pulse wave height maximum value extracted by the parameter extracting section, and a change with time in the maximum Lyapunov index extracted by the parameter extracting section, estimate that the thermal sensation of the living body corresponds to the first status if the pulse wave height maximum value is increased and the maximum Lyapunov index is decreased, estimate that the thermal sensation of the living body corresponds to the second status if the pulse wave height maximum value is decreased and the maximum Lyapunov index is decreased, estimate that the thermal sensation of the living body corresponds to the third status if the pulse wave height maximum value is increased and the maximum Lyapunov index is increased, and estimate that the thermal sensation of the living body corresponds to the fourth status if the pulse wave height maximum value is decreased and the maximum Lyapunov index is increased.

In the above arrangement, the pulse wave height maximum value and the maximum Lyapunov index are extracted by analyzing the time-series data on a pulse wave. A change with time in the extracted pulse wave height maximum value and a change with time in the extracted maximum Lyapunov index are calculated. If the pulse wave height maximum value is increased and the maximum Lyapunov index is decreased, it is estimated that the thermal sensation of the living body corresponds to the first status. If the pulse wave height maximum value is decreased and the maximum Lyapunov index is decreased, it is estimated that the thermal sensation of the living body corresponds to the second status. If the pulse wave height maximum value is increased and the maximum Lyapunov index is increased, it is estimated that the thermal sensation of the living body corresponds to the third status. If the pulse wave height maximum value is decreased and the maximum Lyapunov index is increased, it is estimated that the thermal sensation of the living body corresponds to the fourth status. This enables to accurately estimate the thermal sensations of the living bodies, based on a change with time in the pulse wave height maximum value and a change with time in the maximum Lyapunov index.

Preferably, the environment control device may further comprise a position detecting section for detecting a position of the each of the living bodies, wherein if the estimation result estimated by the living body status estimating section includes an estimation result indicating the third status and an estimation result indicating the fourth status, the integration processing section is operative to select both of the estimation results, and the stimulation controlling section is operative to specify the position of the living body having the estimation result indicating the third status, and the position of the living body having the estimation result indicating the fourth status, based on the positions of the living bodies detected by the position detecting section to individually control the contents of the stimulation to be applied to the living bodies whose position is specified.

In the above arrangement, the positions of the living bodies are detected, and in the case where the estimation result includes the estimation result indicating the third status and the estimation result indicating the fourth status, both of the estimation results are selected. Then, the position of the living body having the estimation result indicating the third status, and the position of the living body having the estimation result indicating the fourth status are specified, based on the detected positions of the living bodies to individually control the contents of the stimulation to be applied to the living bodies whose position is specified.

As described above, the third status indicates that the thermal sensation of the living body is shifted from the neutral condition to the hot condition, and the fourth status indicates that the thermal sensation of the living body is shifted from the neutral condition to the cold condition. In other words, the third status and the fourth status indicate that the thermal sensations are shifted to the opposite conditions. In the case where both of the third status and the fourth status are concurrently detected, it is difficult to control the environment control device so that the thermal sensations of the living bodies are satisfied. In view of this, in the above arrangement, the position of the living body having the estimation result indicating the third status, and the position of the living body having the estimation result indicating the fourth status are specified, and the contents of the stimulation to be applied to the living bodies whose position is specified are individually controlled. This enables to control the environment control device so that the thermal sensations of the living bodies are satisfied, even if the living bodies, whose thermal sensations are shifted to the opposite conditions, stay or reside in a common space.

In the environment control device, preferably, the integration processing section may be operative to prioritize selection of the estimation result on the living body having the thermal sensation corresponding to one of the third status and the fourth status.

In the above arrangement, selection of one of the estimation results indicating that the thermal sensations correspond to the third status and the fourth status, in other words, selection of the estimation result on the living body whose thermal sensation is shifted to a deteriorated condition is prioritized. This enables to properly control the stimulation contents based on the thermal sensations of the living bodies, even if the living bodies stay or reside in a common space.

Preferably, the environment control device may further comprise a status continuation time measuring section for measuring a time when a status identical to the one of the first status, the second status, the third status, and the fourth status estimated by the living body status estimating section is continued, wherein the integration processing section is operative to prioritize selection of the estimation result on the living body having a longest status continuation time to be measured by the status continuation time measuring section.

In the above arrangement, measured is the time when the status identical to the one of the first status, the second status, the third status, and the fourth status is continued, and prioritized is the selection of the estimation result on the living body having the longest status continuation time by the measurement. This enables to avoid likelihood that a specific living body may be exposed to an uncomfortable condition for a long time.

Preferably, the environment control device may further comprise a parameter storing section for storing the parameter extracted by the parameter extracting section when the estimation result estimated by the living body status estimating section indicates that the thermal sensation has shifted from the cold condition to the neutral condition and then to the hot condition, with respect to the each of the living bodies, and storing the parameter extracted by the parameter extracting section when the estimation result estimated by the living body status estimating section indicates that the thermal sensation has shifted from the hot condition to the neutral condition and then to the cold condition, with respect to the each of the living bodies, wherein the integration processing section is operative to compare an absolute value of variation between the parameter stored in the parameter storing section, and a current parameter extracted by the parameter extracting section, with respect to the each of the living bodies to prioritize selection of the estimation result on the living body having a largest absolute value.

In the above arrangement, stored is the parameter extracted when the estimation result indicates that the thermal sensation has shifted from the cold condition to the neutral condition and then to the hot condition, with respect to the each of the living bodies, and stored is the parameter extracted when the estimation result indicates that the thermal sensation has shifted from the hot condition to the neutral condition and then to the cold condition, with respect to the each of the living bodies. Then, comparison is made on the absolute value of variation between the stored parameter and the extracted current parameter with respect to each of the living bodies to prioritize selection of the estimation result on the living body having the largest absolute value.

In the above arrangement, stored is the parameter extracted when the estimation result indicates that the thermal sensation has shifted from the cold condition to the neutral condition and then to the hot condition, or the parameter extracted when the estimation result indicates that the thermal sensation has shifted from the hot condition to the neutral condition and then to the cold condition. In other words, the parameters extracted when the thermal sensations of the living bodies are substantially (0) (indicating that the thermal sensation corresponds to a neutral condition) are stored as reference values, respectively. Then, comparison is made on the absolute value of variation between the stored parameter and the current parameter with respect to each of the living bodies. This enables to suppress an influence of variation by individual differences on the parameter among the living bodies. Also, it is possible to estimate that the thermal sensation of the living body with a larger absolute value of variation between the current parameter and the reference value (stored parameter) has greatly shifted from a neutral condition to a hot condition or a cold condition. This enables to properly control the stimulation contents based on the thermal sensation of the living body who feels colder or hotter than the other living body, and avoid likelihood that a specific user may be exposed to an uncomfortable condition.

INDUSTRIAL APPLICABILITY

The environment control device of the invention is useful in a system constituting a residential environment, particularly, in an air-conditioning system constituting a thermal environment, or the like.

The invention claimed is:
1. An environment control device, comprising:
a processor;
a biological information acquiring section for acquiring time-series data of biological information on a plurality of living bodies applied with a stimulation;
a parameter extracting section for analyzing, using the processor, the time-series data acquired by the biological information acquiring section to extract a parameter which is changed with a lapse of time;
a living body status estimating section for estimating a status of each of the living bodies to the stimulation, based on the parameter extracted by the parameter extracting section;
an integration processing section for integrating estimation results on the living bodies estimated by the living body status estimating section into a single estimation result; and
a stimulation controlling section for controlling contents of the stimulation to be applied to the living bodies, based on the estimation result integrated by the integration processing section,
wherein the stimulation includes a thermal stimulation,
wherein the living body status estimating section is operative to estimate whether a thermal sensation of the living body to the thermal stimulation corresponds to a first status indicating that the thermal sensation is shifted from a cold condition to a neutral condition, a second status indicating that the thermal sensation is shifted from a hot condition to the neutral condition, a third status indicating that the thermal sensation is shifted from the neutral condition to the hot condition, or a fourth status indicating that the thermal sensation is shifted from the neutral condition to the cold condition, based on the parameter extracted by the parameter extracting section, with respect to the each of the living bodies,
wherein the parameter extracting section is operative to extract a first parameter whose value is increased, as the thermal sensation is shifted from the cold condition to the neutral condition, and then to the hot condition, and a second parameter which has a minimal value when the thermal sensation corresponds to the neutral condition, whose value is increased, as the thermal sensation is shifted from the neutral condition to the cold condition, and whose value is increased, as the thermal sensation is shifted from the neutral condition to the hot condition,
wherein the first parameter is a pulse wave height maximum value,
wherein the second parameter is a maximum Lyapunov index, and
wherein the living body status estimating section is operative to calculate a change with time in the pulse wave height maximum value extracted by the parameter extracting section, and a change with time in the maximum Lyapunov index extracted by the parameter extracting section, estimate that the thermal sensation of the living body corresponds to the first status if the pulse wave height maximum value is increased and the maximum Lyapunov index is decreased, estimate that the thermal sensation of the living body corresponds to the second status if the pulse wave height maximum value is decreased and the maximum Lyapunov index is decreased, estimate that the thermal sensation of the living body corresponds to the third status if the pulse wave height maximum value is increased and the maximum Lyapunov index is increased, and estimate that the thermal sensation of the living body corresponds to the fourth status if the pulse wave height maximum value is decreased and the maximum Lyapunov index is increased.

2. The environment control device according to claim 1, further comprising
a position detecting section for detecting a position of the each of the living bodies,
wherein if the estimation result estimated by the living body status estimating section includes an estimation result indicating the third status and an estimation result indicating the fourth status, the integration processing section is operative to select both of the estimation results, and
wherein the stimulation controlling section is operative to specify the position of the living body having the estimation result indicating the third status, and the position of the living body having the estimation result indicating the fourth status, based on the positions of the living bodies detected by the position detecting section to individually control the contents of the stimulation to be applied to the living bodies whose position is specified.

3. The environment control device according to claim 1, wherein the integration processing section is operative to prioritize selection of the estimation result on the living body having the thermal sensation corresponding to one of the third status and the fourth status.

4. The environment control device according to claim 1, further comprising
a status continuation time measuring section for measuring a time when a status identical to the one of the first status, the second status, the third status, and the fourth status estimated by the living body status estimating section is continued,
wherein the integration processing section is operative to prioritize selection of the estimation result on the living body having a longest status continuation time to be measured by the status continuation time measuring section.

5. The environment control device according to claim 1, further comprising
a parameter storing section for storing the parameter extracted by the parameter extracting section when the estimation result estimated by the living body status estimating section indicates that the thermal sensation has shifted from the cold condition to the neutral condition and then to the hot condition, with respect to the each of the living bodies, and storing the parameter extracted by the parameter extracting section when the estimation result estimated by the living body status estimating section indicates that the thermal sensation has shifted from the hot condition to the neutral condition and then to the cold condition, with respect to the each of the living bodies,
wherein the integration processing section is operative to compare an absolute value of variation between the parameter stored in the parameter storing section, and a current parameter extracted by the parameter extracting section, with respect to the each of the living bodies to prioritize selection of the estimation result on the living body having a largest absolute value.

6. An environment control method, comprising:
a biological information acquiring step of acquiring time-series data of biological information on a plurality of living bodies applied with a stimulation;
a parameter extracting step of analyzing, using a processor, the time-series data acquired in the biological information acquiring step to extract a parameter which is changed with a lapse of time;
a living body status estimating step of estimating a status of each of the living bodies to the stimulation, based on the parameter extracted in the parameter extracting step;
an integration processing step of integrating estimation results on the living bodies estimated in the living body status estimating step into a single estimation result; and
a stimulation controlling step of controlling contents of the stimulation to be applied to the living bodies, based on the estimation result integrated in the integration processing step,
wherein the stimulation includes a thermal stimulation,
wherein the living body status estimating step is operative to estimate whether a thermal sensation of the living body to the thermal stimulation corresponds to a first status indicating that the thermal sensation is shifted from a cold condition to a neutral condition, a second status indicating that the thermal sensation is shifted from a hot condition to the neutral condition, a third status indicating that the thermal sensation is shifted from the neutral condition to the hot condition, or a fourth status indicating that the thermal sensation is shifted from the neutral condition to the cold condition, based on the parameter extracted by the parameter extracting step, with respect to the each of the living bodies,
wherein the parameter extracting step is operative to extract a first parameter whose value is increased, as the thermal sensation is shifted from the cold condition to the neutral condition, and then to the hot condition, and a second parameter which has a minimal value when the thermal sensation corresponds to the neutral condition, whose value is increased, as the thermal sensation is shifted from the neutral condition to the cold condition, and whose value is increased, as the thermal sensation is shifted from the neutral condition to the hot condition,
wherein the first parameter is a pulse wave height maximum value,
wherein the second parameter is a maximum Lyapunov index, and
wherein the living body status estimating step is operative to calculate a change with time in the pulse wave height maximum value extracted by the parameter extracting step, and a change with time in the maximum Lyapunov index extracted by the parameter extracting step, estimate that the thermal sensation of the living body corresponds to the first status if the pulse wave height maximum value is increased and the maximum Lyapunov index is decreased, estimate that the thermal sensation of the living body corresponds to the second status if the pulse wave height maximum value is decreased and the maximum Lyapunov index is decreased, estimate that the thermal sensation of the living body corresponds to the third status if the pulse wave height maximum value is increased and the maximum Lyapunov index is increased, and estimate that the thermal sensation of the living body corresponds to the fourth status if the pulse wave height maximum value is decreased and the maximum Lyapunov index is increased.

7. A non-transitory computer readable recording medium storing an environment control program, wherein, when executed, the environment control program causes a computer to function as:
a biological information acquiring section for acquiring time-series data of biological information on a plurality of living bodies applied with a stimulation;

a parameter extracting section for analyzing the time-series data acquired by the biological information acquiring section to extract a parameter which is changed with a lapse of time;

a living body status estimating section for estimating a status of each of the living bodies to the stimulation, based on the parameter extracted by the parameter extracting section;

an integration processing section for integrating estimation results on the living bodies estimated by the living body status estimating section into a single estimation result; and a stimulation controlling section for controlling contents of the stimulation to be applied to the living bodies, based on the estimation result integrated by the integration processing section, wherein the stimulation includes a thermal stimulation, wherein the living body status estimating section is operative to estimate whether a thermal sensation of the living body to the thermal stimulation corresponds to a first status indicating that the thermal sensation is shifted from a cold condition to a neutral condition, a second status indicating that the thermal sensation is shifted from a hot condition to the neutral condition, a third status indicating that the thermal sensation is shifted from the neutral condition to the hot condition, or a fourth status indicating that the thermal sensation is shifted from the neutral condition to the cold condition, based on the parameter extracted by the parameter extracting section, with respect to the each of the living bodies, wherein the parameter extracting section is operative to extract a first parameter whose value is increased, as the thermal sensation is shifted from the cold condition to the neutral condition, and then to the hot condition, and a second parameter which has a minimal value when the thermal sensation corresponds to the neutral condition, whose value is increased, as the thermal sensation is shifted from the neutral condition to the cold condition, and whose value is increased, as the thermal sensation is shifted from the neutral condition to the hot condition, wherein the first parameter is a pulse wave height maximum value, wherein the second parameter is a maximum Lyapunov index, and wherein the living body status estimating section is operative to calculate a change with time in the pulse wave height maximum value extracted by the parameter extracting section, and a change with time in the maximum Lyapunov index extracted by the parameter extracting section, estimate that the thermal sensation of the living body corresponds to the first status if the pulse wave height maximum value is increased and the maximum Lyapunov index is decreased, estimate that the thermal sensation of the living body corresponds to the second status if the pulse wave height maximum value is decreased and the maximum Lyapunov index is decreased, estimate that the thermal sensation of the living body corresponds to the third status if the pulse wave height maximum value is increased and the maximum Lyapunov index is increased, and estimate that the thermal sensation of the living body corresponds to the fourth status if the pulse wave height maximum value is decreased and the maximum Lyapunov index is increased.

8. An environment control system, comprising:

a processor;

a stimulation generating section for generating a stimulation to be applied to a plurality of living bodies;

a measuring section for measuring biological information on each of the living bodies;

a biological information acquiring section for acquiring time-series data of biological information on the living bodies measured by the measuring section;

a parameter extracting section for analyzing, using the processor, the time-series data acquired by the biological information acquiring section to extract a parameter which is changed with a lapse of time;

a living body status estimating section for estimating a status of the each of the living bodies to the stimulation generated by the stimulation generating section, based on the parameter extracted by the parameter extracting section;

an integration processing section for integrating estimation results on the living bodies estimated by the living body status estimating section into a single estimation result; and a stimulation controlling section for controlling the stimulation generating section based on the estimation result integrated by the integration processing section, wherein the stimulation includes a thermal stimulation, wherein the living body status estimating section is operative to estimate whether a thermal sensation of the living body to the thermal stimulation corresponds to a first status indicating that the thermal sensation is shifted from a cold condition to a neutral condition, a second status indicating that the thermal sensation is shifted from a hot condition to the neutral condition, a third status indicating that the thermal sensation is shifted from the neutral condition to the hot condition, or a fourth status indicating that the thermal sensation is shifted from the neutral condition to the cold condition, based on the parameter extracted by the parameter extracting section, with respect to the each of the living bodies, wherein the parameter extracting section is operative to extract a first parameter whose value is increased, as the thermal sensation is shifted from the cold condition to the neutral condition, and then to the hot condition, and a second parameter which has a minimal value when the thermal sensation corresponds to the neutral condition, whose value is increased, as the thermal sensation is shifted from the neutral condition to the cold condition, and whose value is increased, as the thermal sensation is shifted from the neutral condition to the hot condition, wherein the first parameter is a pulse wave height maximum value, wherein the second parameter is a maximum Lyapunov index, and wherein the living body status estimating section is operative to calculate a change with time in the pulse wave height maximum value extracted by the parameter extracting section, and a change with time in the maximum Lyapunov index extracted by the parameter extracting section, estimate that the thermal sensation of the living body corresponds to the first status if the pulse wave height maximum value is increased and the maximum Lyapunov index is decreased, estimate that the thermal sensation of the living body corresponds to the second status if the pulse wave height maximum value is decreased and the maximum Lyapunov index is decreased, estimate that the thermal sensation of the living body corresponds to the third status if the pulse wave height maximum value is increased and the maximum Lyapunov index is increased, and estimate that the thermal sensation of the living body corresponds to the fourth status if the pulse wave height maximum value is decreased and the maximum Lyapunov index is increased.

* * * * *